(12) United States Patent
Ueda

(10) Patent No.: US 11,230,010 B2
(45) Date of Patent: Jan. 25, 2022

(54) ROBOT SYSTEM AND COUPLING METHOD

(71) Applicant: Seiko Epson Corporation, Tokyo (JP)

(72) Inventor: Junya Ueda, Azumino (JP)

(73) Assignee: Seiko Epson Corporation

( * ) Notice: Subject to any disclaimer, the term of this patent is extended or adjusted under 35 U.S.C. 154(b) by 222 days.

(21) Appl. No.: 16/705,315

(22) Filed: Dec. 6, 2019

(65) Prior Publication Data

US 2020/0180157 A1 Jun. 11, 2020

(30) Foreign Application Priority Data

Dec. 7, 2018 (JP) .............................. JP2018-230437

(51) Int. Cl.
*B25J 9/00* (2006.01)
*B25J 9/16* (2006.01)
*B25J 15/00* (2006.01)
*B25J 9/10* (2006.01)

(52) U.S. Cl.
CPC ........... *B25J 9/1687* (2013.01); *B25J 9/1015* (2013.01); *B25J 9/1633* (2013.01); *B25J 9/1697* (2013.01); *B25J 15/0004* (2013.01)

(58) Field of Classification Search
CPC ...... B25J 9/0078; B25J 11/00; B25J 17/0266; B25J 19/0029; B25J 9/0018; B25J 9/003; B25J 9/0051; B25J 13/085; E04G 21/0418; Y10S 901/27
See application file for complete search history.

(56) References Cited

U.S. PATENT DOCUMENTS

2009/0066100 A1* 3/2009 Bosscher ............. B25J 17/0266
    294/86.4
2014/0360306 A1* 12/2014 Mihara ................ B25J 19/0029
    74/490.02

FOREIGN PATENT DOCUMENTS

JP 2010-069587 A 4/2010

* cited by examiner

*Primary Examiner* — Ian Jen
(74) *Attorney, Agent, or Firm* — Harness, Dickey & Pierce, P.L.C.

(57) ABSTRACT

A robot system that performs work of coupling a flexible cable to a connector provided on a board, includes a robot in which a gripping unit that grips the cable and a force detection unit that detects a force acting on the gripping unit are provided, a control unit that controls the robot to perform a conveyance action to grip the cable using the gripping unit and convey the cable onto the board, and an insertion action to insert the cable into the connector by force control based on a detection result in the force detection unit, an insertion speed entry part in which an insertion speed of the cable into the connector at the insertion action is entered, and a determination unit that can determine force control information necessary for the force control in the insertion action according to the insertion speed.

13 Claims, 19 Drawing Sheets

| | CONVEYANCE SPEED | VIRTUAL COEFFICIENT OF INERTIA | VIRTUAL COEFFICIENT OF VISCOSITY | VIRTUAL MODULUS OF ELASTICITY | TARGET FORCE |
|---|---|---|---|---|---|
| 411 → | 1 | **** | **** | **** | **** |
| | 2 | **** | **** | **** | **** |
| | 3 | **** | **** | **** | **** |
| | 4 | **** | **** | **** | **** |
| | 5 | **** | **** | **** | **** |
| | 6 | **** | **** | **** | **** |
| | . | . | . | . | . |
| | . | . | . | . | . |
| | . | . | . | . | . |

| PRESSING SPEED | VIRTUAL COEFFICIENT OF INERTIA | VIRTUAL COEFFICIENT OF VISCOSITY | VIRTUAL MODULUS OF ELASTICITY | TARGET FORCE |
|---|---|---|---|---|
| 1 | **** | **** | **** | **** |
| 2 | **** | **** | **** | **** |
| 3 | **** | **** | **** | **** |
| 4 | **** | **** | **** | **** |
| 5 | **** | **** | **** | **** |
| 6 | **** | **** | **** | **** |
| ⋮ | ⋮ | ⋮ | ⋮ | ⋮ |

421 → (row 1)

| INSERTION SPEED | VIRTUAL COEFFICIENT OF INERTIA | VIRTUAL COEFFICIENT OF VISCOSITY | VIRTUAL MODULUS OF ELASTICITY | TARGET FORCE |
|---|---|---|---|---|
| 1 | **** | **** | **** | **** |
| 2 | **** | **** | **** | **** |
| 3 | **** | **** | **** | **** |
| 4 | **** | **** | **** | **** |
| 5 | **** | **** | **** | **** |
| 6 | **** | **** | **** | **** |
| ⋮ | ⋮ | ⋮ | ⋮ | ⋮ |

431 → (row 1)

ROBOT SYSTEM AND COUPLING METHOD

The present application is based on, and claims priority from, JP Application Serial Number 2018-230437, filed Dec. 7, 2018, the disclosure of which is hereby incorporated by reference herein in its entirety.

BACKGROUND

1. Technical Field

The present disclosure relates to a robot system and coupling method.

2. Related Art

For example, JP-A-2010-69587 discloses a robot system including an articulated robot and a controller that controls the articulated robot. The robot of the robot system described in JP-A-2010-69587 has a distal end portion to which an end effector that grips a cable is attached. The robot may perform coupling work of inserting and coupling the cable gripped by the end effector into a connector under a force control condition.

Generally, it is known that work of creating a control program for execution of force control requires skill. Accordingly, for example, for changing the control program, the changing work is not easy depending on the contents to change and the degree of proficiency of a programmer.

SUMMARY

The present disclosure is for solving the above problems and can be implemented as the following embodiments.

A robot system according to an aspect of the present disclosure is a robot system that performs work of coupling a flexible cable to a connector provided on a board, including a robot in which a gripping unit that grips the cable and a force detection unit that detects a force acting on the gripping unit are provided, a control unit that controls the robot to perform a conveyance action to grip the cable using the gripping unit and convey the cable onto the board, and an insertion action to insert the cable into the connector by force control based on a detection result in the force detection unit, an insertion speed entry part in which an insertion speed of the cable into the connector at the insertion action is entered, a memory unit that stores a calibration curve showing a relationship between the insertion speed and force control information necessary for the force control in the insertion action, and a determination unit that determines the force control information according to the insertion speed based on the calibration curve.

A coupling method according to an aspect of the present disclosure is a coupling method of coupling a flexible cable to a connector provided on a board, including a preparation step of preparing a robot in which a gripping unit that grips the cable and a force detection unit that detects a force acting on the gripping unit are provided, a conveyance step of performing a conveyance action to grip the cable using the gripping unit and convey the cable onto the board, an insertion step of performing an insertion action to insert the cable into the connector using the gripping unit by force control based on a detection result in the force detection unit, an insertion speed entry step of entering an insertion speed of the cable into the connector at the insertion action in an insertion speed entry part, and a force control information at insertion action determination step of determining force control information by a determination unit according to the insertion speed based on a calibration curve showing a relationship between the insertion speed and the force control information necessary for the force control in the insertion action and stored in a memory unit.

BRIEF DESCRIPTION OF THE DRAWINGS

FIG. 29 shows an example of a setting window for setting action conditions of the robot when the robot system shown in FIG. 1 executes the coupling method shown in FIG. 2.

FIG. 30 shows an example of a setting window for setting action conditions of the robot when the robot system shown in FIG. 1 executes the coupling method shown in FIG. 2.

DESCRIPTION OF EXEMPLARY EMBODIMENTS

As below, a robot system and coupling method according to the present disclosure will be explained in detail based on preferred embodiments shown in the accompanying drawings. Hereinafter, for convenience of explanation, the upsides in FIGS. 1 and 3 to 12 and FIGS. 21 to 27 may be referred to as "upper" or "above" and the downsides may be referred to as "lower" or "below". Further, "horizontal" in this specification is not limited to a completely horizontal state, but includes states with inclinations e.g. less than about 10° relative to the horizontal state. Furthermore, "vertical" in this specification is not limited to a completely vertical state, but includes states with inclinations e.g. less than about 10° relative to the vertical state unless conveyance of electronic components is hindered.

First Embodiment

Figure 1:
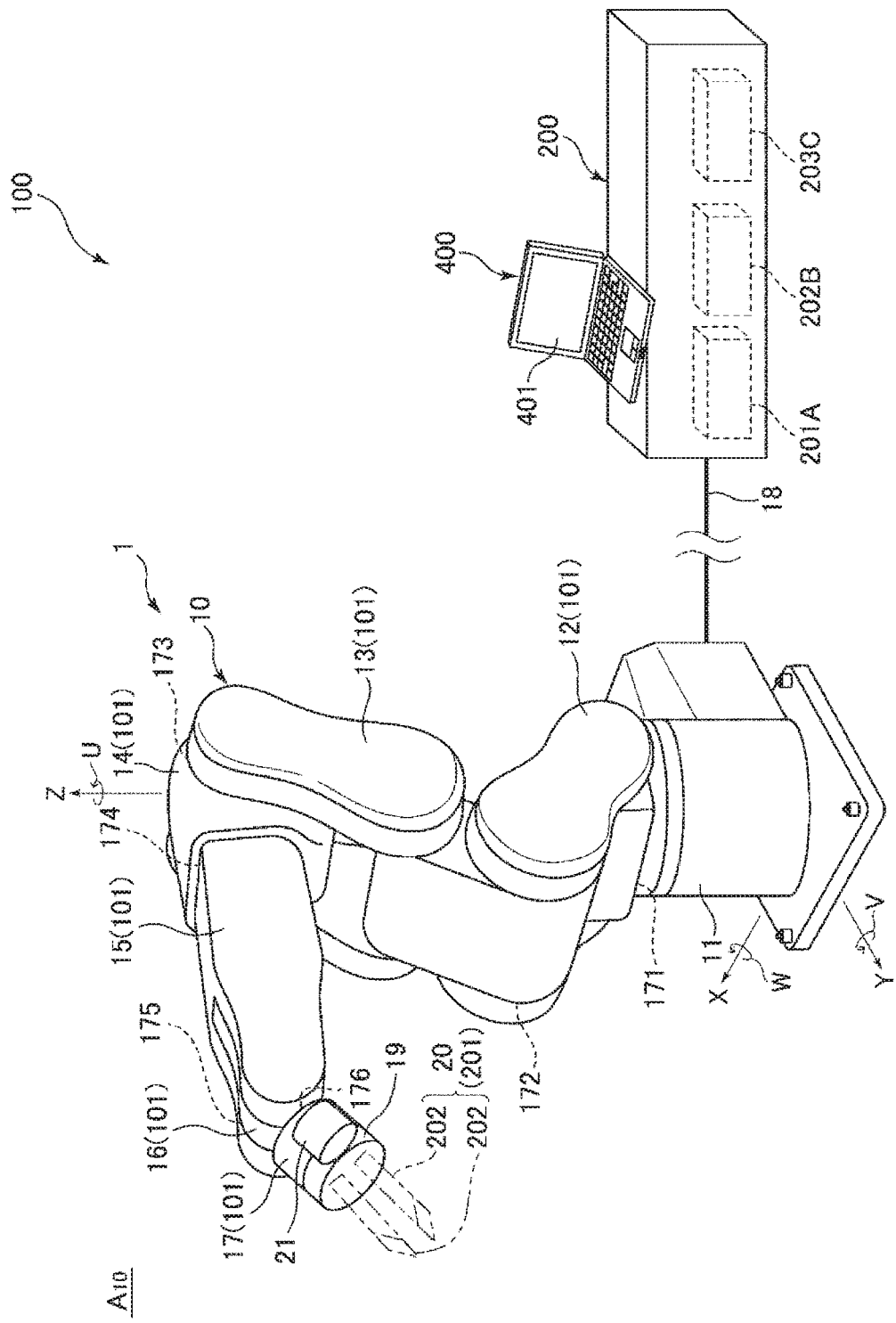
FIG. 1 shows an overall configuration of a robot system of a first embodiment.

As shown in FIG. 1, a robot system 100 includes a robot 1 and a robot control apparatus (hereinafter, simply referred to as "control apparatus") 200 that controls the robot 1, and executes the coupling method according to the present disclosure.

The robot 1 is a single-arm six-axis vertical articulated robot in the embodiment, and an end effector 20 may be attached to the distal end portion thereof. The robot 1 is the single-arm articulated robot, however, may be e.g. a dual-arm articulated robot.

The control apparatus 200 is placed apart from the robot 1 and includes a computer with a CPU (Central Processing Unit) as an example of a processor provided inside etc. The robot system 100 may perform coupling work of coupling a flexible cable 93 to a connector 92 provided on a board 91.

The robot 1 has a base 11 and a movable unit 10.

The base 11 is a support that supports the movable unit 10 drivably from below, and fixed to e.g. a floor within a factory. In the robot 1, the base 11 is electrically coupled to the control apparatus 200 via a relay cable 18. Note that the coupling between the robot 1 and the control apparatus 200 is not limited to wired coupling like the configuration shown in FIG. 1, but may be wireless coupling or coupling via a network such as the Internet, for example.

The movable unit 10 has a plurality of arms 101 pivotably coupled to each other. The coupling work is performed on a workbench 300 placed within a drive range $A_{10}$ in which the movable unit 10 can be driven at the maximum.

In the embodiment, the movable unit 10 has a first arm 12, a second arm 13, a third arm 14, a fourth arm 15, a fifth arm 16, and a sixth arm 17, and these arms 101 are sequentially coupled from the base 11 side. Note that the number of arms 101 of the movable unit 10 is not limited to six, but may be e.g. one, two, three, four, five, seven, or more. Further, the sizes of the respective arms 101 including the entire lengths are respectively not particularly limited, but can be appropriately set.

The base 11 and the first arm 12 are coupled via a joint 171. The first arm 12 is pivotable around a first pivot axis parallel to the vertical direction as a pivot center about the first pivot axis relative to the base 11. The first pivot axis coincides with the normal of the floor to which the base 11 is fixed.

The first arm 12 and the second arm 13 are coupled via a joint 172. The second arm 13 is pivotable around a second pivot axis parallel to the horizontal direction as a pivot center relative to the first arm 12. The second pivot axis is parallel to an axis orthogonal to the first pivot axis.

The second arm 13 and the third arm 14 are coupled via a joint 173. The third arm 14 is pivotable around a third pivot axis parallel to the horizontal direction as a pivot center relative to the second arm 13. The third pivot axis is parallel to the second pivot axis.

The third arm 14 and the fourth arm 15 are coupled via a joint 174. The fourth arm 15 is pivotable around a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. The fifth arm 16 is pivotable around a fifth pivot axis as a pivot center relative to the fourth arm 15. The fifth pivot axis is orthogonal to the fourth pivot axis.

The fifth arm 16 and the sixth arm 17 are coupled via a joint 176. The sixth arm 17 is pivotable around a sixth pivot axis as a pivot center relative to the fifth arm 16. The sixth pivot axis is orthogonal to the fifth pivot axis.

Further, the sixth arm 17 is a robot distal end portion located at the most distal end side of the movable unit 10. The sixth arm 17 may pivot together with the end effector 20 by driving of the movable unit 10.

In the robot 1, a force detection unit 19 that detects a force is detachably placed in the movable unit 10. The movable unit 10 may be driven with the force detection unit 19 placed therein.

In the embodiment, the force detection unit 19 is placed in the sixth arm 17. Note that the location in which the force detection unit 19 is placed is not limited to the sixth arm 17, i.e., the arm 101 located at the most distal end side, but may be e.g. the other arm 101 or between the adjacent arms 101.

Figure 3:
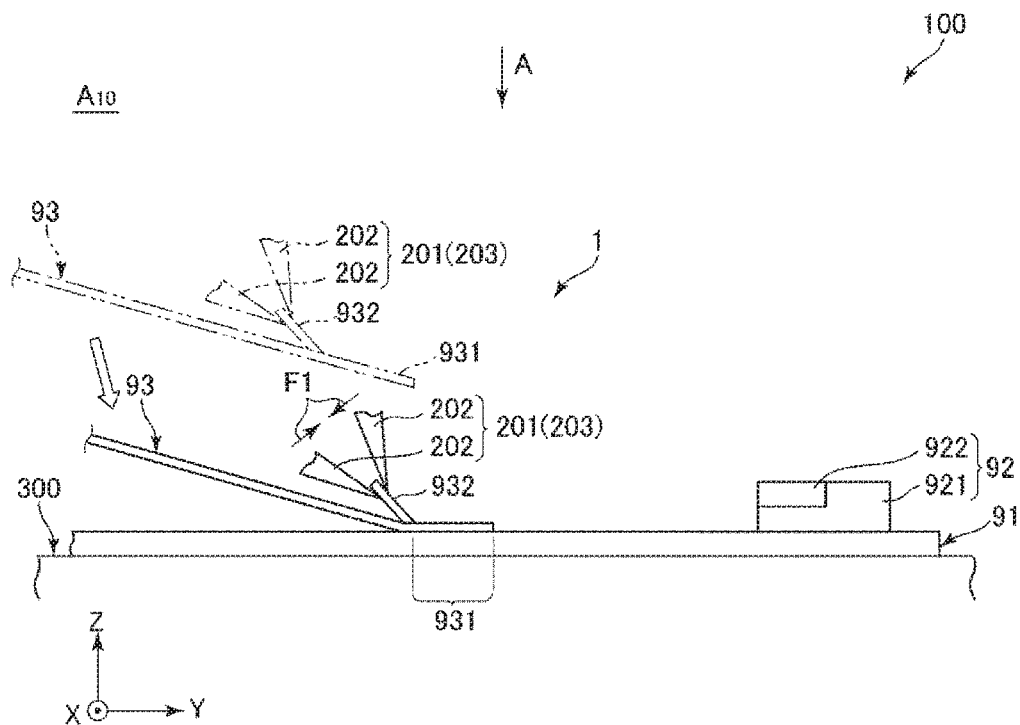
FIG. 3 is a side view sequentially showing an action state of a robot when the robot system shown in FIG. 1 executes the coupling method shown in FIG. 2.

The end effector 20 may be detachably attached to the force detection unit 19. The end effector 20 is a gripping unit 201 configured to grip the cable 93. As shown in FIG. 3, the gripping unit 201 includes a nipping part 203 having a pair of nipping pieces 202 that nip the cable 93, and may grip the cable 93 by the nipping.

Further, the gripping unit 201 is configured to change the gripping force, i.e., the nipping force for the cable 93. The configuration is not particularly limited. For example, the gripping force can be changed by changing of the degree of closeness between the nipping pieces 202.

The gripping unit 201 is not limited to one that grips the cable 93 by nipping, but may be e.g. one that grips the cable 93 by suction.

The force detection unit 19 may detect a force acting on the gripping unit 201 at the coupling work by the robot 1 or the like. The force detection unit 19 is not particularly limited, but, in the embodiment, a six-axis force sensor that can detect force components in respective axis directions of an X-axis, a Y-axis, a Z-axis orthogonal to one another, a force component in W directions about the X-axis, a force component in V directions about the Y-axis, and a force component in U directions about the Z-axis is used. Note that, in the embodiment, the Z-axis direction is the vertical direction. Further, the force components in the respective axis directions may be referred to as "translational force components" and the force components about the respective axes may be referred to as "torque components". The force detection unit 19 is not limited to the six-axis force sensor, but may have another configuration.

As shown in FIG. 1, the robot 1 has an imaging unit 21 coupled to the fifth arm 16. The imaging unit 21 may image e.g. the cable 93 gripped by the gripping unit 201 and the connector 92 on the board 91 together. Note that the imaging unit 21 is not particularly limited, but e.g. a CCD (Charge Coupled Device) camera or the like may be used.

The robot system 100 includes e.g. a notebook or tablet personal computer (hereinafter, referred to as "PC") 400. The PC 400 contains a display as a display unit 401 that displays various kinds of information. The display unit 401 has liquid crystal and has a touch panel function. Further, respective input operations etc. may be performed by direct touch with the display unit 401 with hand. The PC 400 is electrically coupled to the control apparatus 200. Note that the coupling between the PC 400 and the control apparatus 200 is preferably wireless coupling, but may be wired coupling or coupling via a network such as the Internet.

Figure 12:
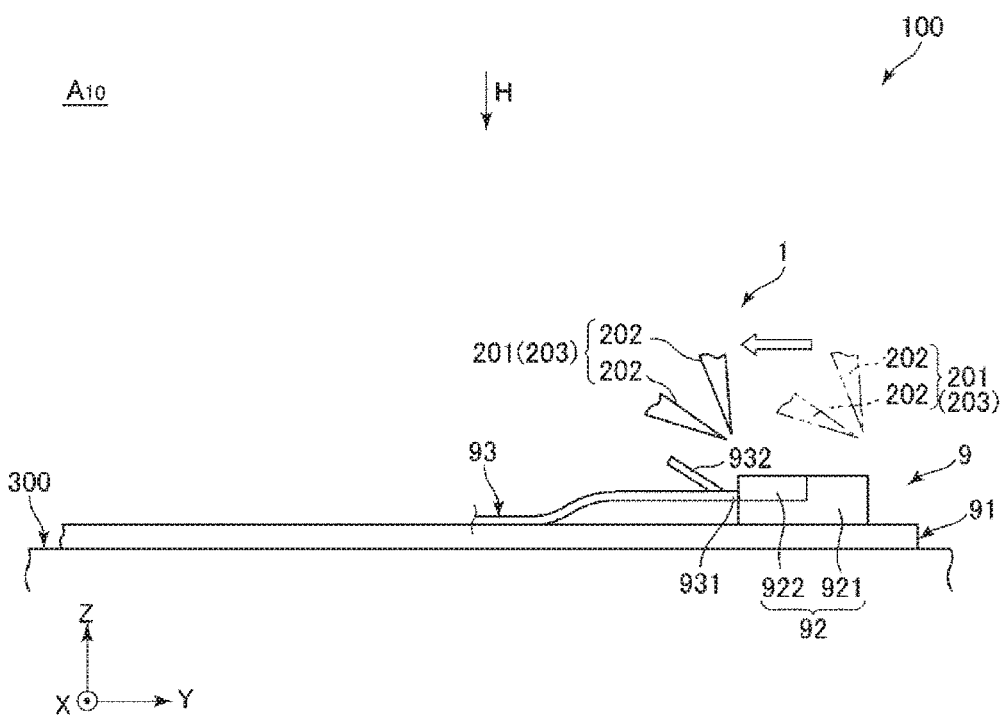
FIG. 12 is a side view sequentially showing an action state of the robot when the robot system shown in FIG. 1 executes the coupling method shown in FIG. 2.
Figure 20:
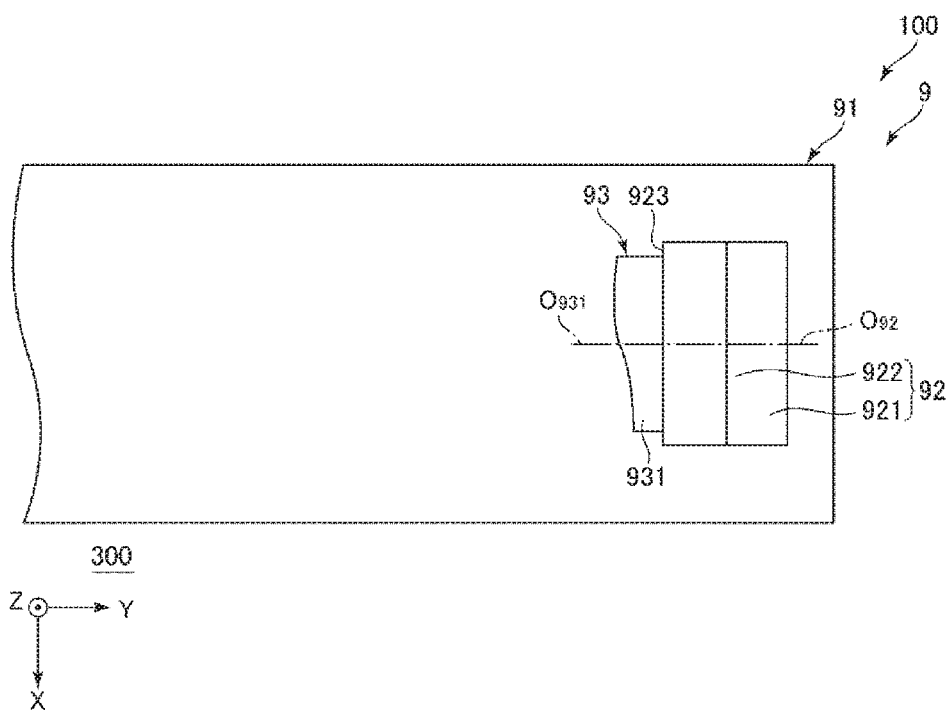
FIG. 20 is a view as seen in a direction of an arrow H in FIG. 12.

As described above, the robot system 100 is used in the coupling work of coupling the flexible cable 93 to the connector 92 provided on the board 91. By the coupling work, an electronic component assembly 9 shown in FIGS. 12 and 20 is obtained.

As shown in FIGS. 3 to 20, the board 91 is a circuit board having a plate shape on which a circuit pattern (not shown) is formed.

Onto the board 91, the connector 92 is fixed. The connector 92 has a plurality of terminals (not shown) electrically coupled to the circuit pattern.

Further, in the embodiment, the connector 92 is the so-called "two-action connector". The connector 92 has a connector main body 921 and a lid body 922 pivotably supported on the connector main body 921. The lid body 922 may open and close by pivoting about an axis parallel to the X-axis. The lid body 922 is in an open state prior to insertion of the cable 93 and a closed state after the insertion of the cable 93. Note that the connector 92 is not limited to "two-action connector", but may be e.g. the so-called "one-action connector" without the lid body 922.

The cable 93 is e.g. an FPC (Flexible Printed Circuits) or FFC (Flexible Flat Cable) in an elongated shape having flexibility. A coupling end portion 931 to be inserted into the connector 92 and having a plurality of terminals (not shown) electrically coupled to the respective terminals of the connector 92 in the inserted condition is provided in an end part of the cable 93. Further, a tab 932 as a small piece is formed to project in the middle of the cable 93 in the longitudinal direction. For gripping the cable 93, the gripping unit 201 may perform the gripping action by nipping the tab 932.

Figure 2:
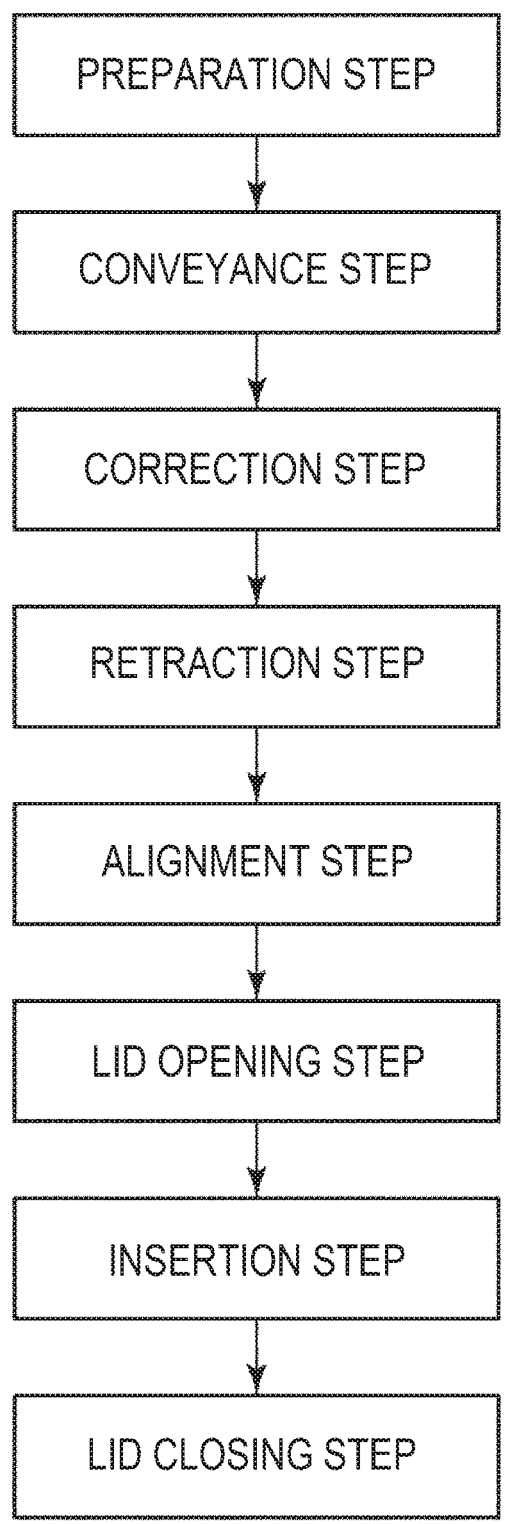
FIG. 2 is a flowchart sequentially showing steps of a coupling method.

The robot system 100 having the above described configuration may execute a coupling method of coupling the cable 93 to the connector 92 on the board 91. As shown in FIG. 2, the coupling method has a preparation step, a conveyance step, a correction step, a retraction step, an alignment step, a lid opening step, an insertion step, and a lid closing step.

Further, when the robot system 100 executes the coupling method, the control apparatus 200 has a control unit 201A that controls the robot 1 to perform a conveyance action at the conveyance step, a correction action at the correction step, a retraction action at the retraction step, an alignment action at the alignment step, a lid opening action at the lid opening step, an insertion action at the insertion step, and a lid closing action at the lid closing step. For example, a part or entire of the CPU has the function of the control unit 201A.

The control unit 201A controls the actions of the robot 1 at the respective steps by force control or the like. "Force control" is control for the actions of the robot 1 of changing the position and the posture of the gripping unit 201 and pushing and pulling the gripping unit 201 based on the detection results of the force detection unit 19. The force control includes e.g. impedance control and force trigger control.

In the force trigger control, force detection is performed using the force detection unit 19 and the movable unit 10 is moved or changed in posture until a predetermined force is detected by the force detection unit 19.

The impedance control includes profile control. First, briefly, in the impedance control, the action of the movable unit 10 is controlled to maintain the force applied to the distal end portion of the movable unit 10 at a predetermined force as far as possible, that is, maintain a force in a predetermined direction detected by the force detection unit 19 at a target value as far as possible. Thereby, for example, when the impedance control is performed on the movable unit 10, the movable unit 10 performs an action of allowing the griping unit 201 together with the cable 93 to trace the connector 92 with respect to the predetermined direction. Here, "target value" contains zero. For example, in the case of the tracing action, the target value may be set to "0" and, in the case of pressing action, which will be described later, the target value may be set to another value than "0".

More specifically, for example, the model of the impedance control of the robot 1 is expressed by the following equation of motion (A):

$$f(t) = mx'' + cx' + kx \qquad (A).$$

In the equation (A), m is a mass (inertia), c is a coefficient of viscosity, k is a modulus of elasticity (rigidity), f (t) is a force, x is displacement (position) from a target position. Further, the first derivative of x, i.e., x' corresponds to a velocity, the second derivative of x, i.e., x" corresponds to an acceleration. Hereinafter, m, c, and k are respectively also simply referred to as "parameters".

In the impedance control, a control system for providing the characteristics of the equation (A) to the distal end portion of the movable unit 10 is formed. That is, the control is performed as if the distal end portion of the movable unit 10 had a virtual coefficient of inertia, a virtual coefficient of viscosity, and a virtual modulus of elasticity expressed by the equation (A). Note that "virtual coefficient of inertia" is also referred to as "virtual mass".

Further, the respective parameters m, c, and k in the equation (A) are not particularly limited, but appropriately set based on various conditions. That is, the respective parameters m, c, and k are set to values convenient for the actions performed by the robot 1.

[1] Preparation Step

The preparation step is a step of preparing the robot 1 in which the gripping unit 201 and the force detection unit are provided and the control apparatus 200. Here, "preparation" refers to starting up of the robot system 100 into an operable state for the coupling work by the robot system 100.

At the preparation step, the preparation is made with the board 91 held on the workbench 300 in a horizontal posture. The state is maintained until the lid closing step. Further, the connector 92 was previously fixed to the board 91. In the connector 92, the lid body 922 is closed.

Further, at the preparation step, the cable 93 was also previously prepared on a workbench (not shown) different from the workbench 300. The gripping unit 201 may grip and convey the tab 932 of the cable 93 from the workbench at the conveyance step as the next step.

[2] Conveyance Step

As shown in FIG. 3, the gripping unit 201 grips the tab 932 of the cable 93 with a first gripping force F1. Hereinafter, the state is referred to as "first gripping state". The conveyance step is a step at which the conveyance action to convey the cable 93 onto the board 91 is performed in the first gripping state. The first gripping force F1 may also be referred to as first nipping force for nipping the tab 932, and preferably has magnitude that may prevent the cable 93 from dropping off the gripping unit 201 during conveyance of the cable 93. For example, the gripping unit 201 may be configured to change the gripping force thereof using a motor.

During the conveyance action, a force acts on the gripping unit 201 after the coupling end portion 931 of the cable 93 comes into contact with the board 91. The force is detected by the force detection unit 19. Then, the control apparatus 200 controls a time to stop the conveyance action based on a detection result in the force detection unit 19. For example, when the force detected by the force detection unit 19 reaches a first threshold value, the apparatus stops the conveyance action.

Further, at the conveyance step, the conveyance action is performed with the tab 932 of the cable 93 nipped so that the nipping directions by the gripping unit 201, i.e., the nipping part 203 may be along the vertical directions, i.e., the upward and downward directions. Thereby, the posture of the coupling end portion 931 relative to the board 91 becomes stable and the force detection by the force detection unit 19 may be stably performed.

Figure 13:
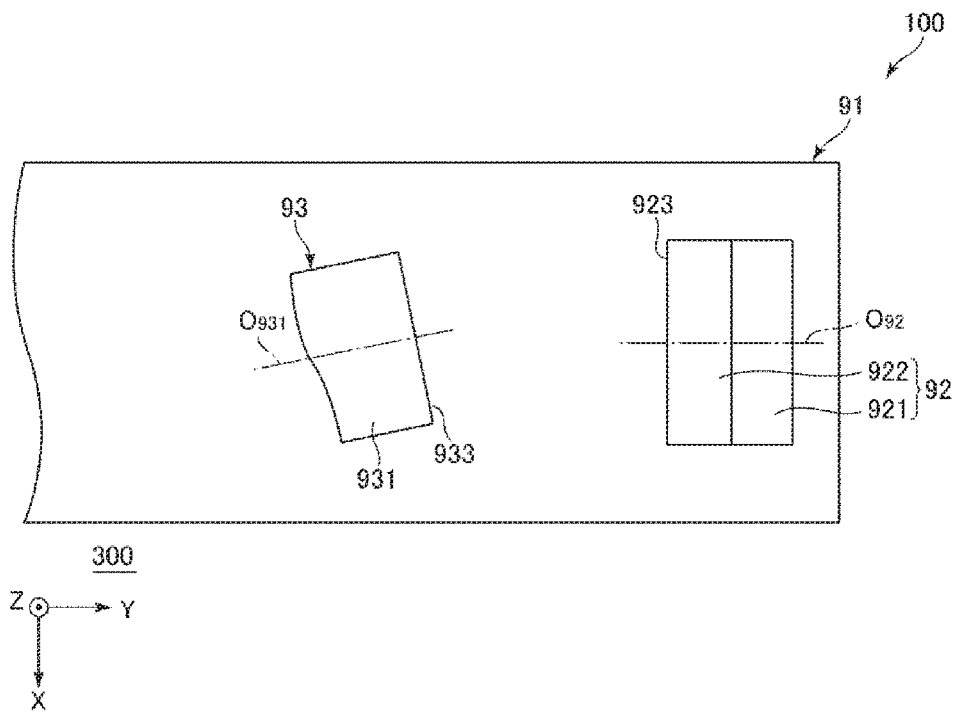
FIG. 13 is a view as seen in a direction of an arrow A in FIG. 3.

On the board 91, the cable 93 stops in a position where the coupling end portion 931 is apart from the connector 92 at the negative side in the Y-axis direction. In this regard, as an example, it is assumed that a center line $O_{931}$ of the coupling end portion 931 is inclined relative to a center line $O_{92}$ of the connector 92 as shown in FIG. 13. Here, the center line $O_{92}$ is parallel to the Y-axis. Further, an end surface 933 of the coupling end portion 931 of the cable 93 faces the side of the connector main body 921 of the connector 92.

[3] Correction Step

Figure 4:
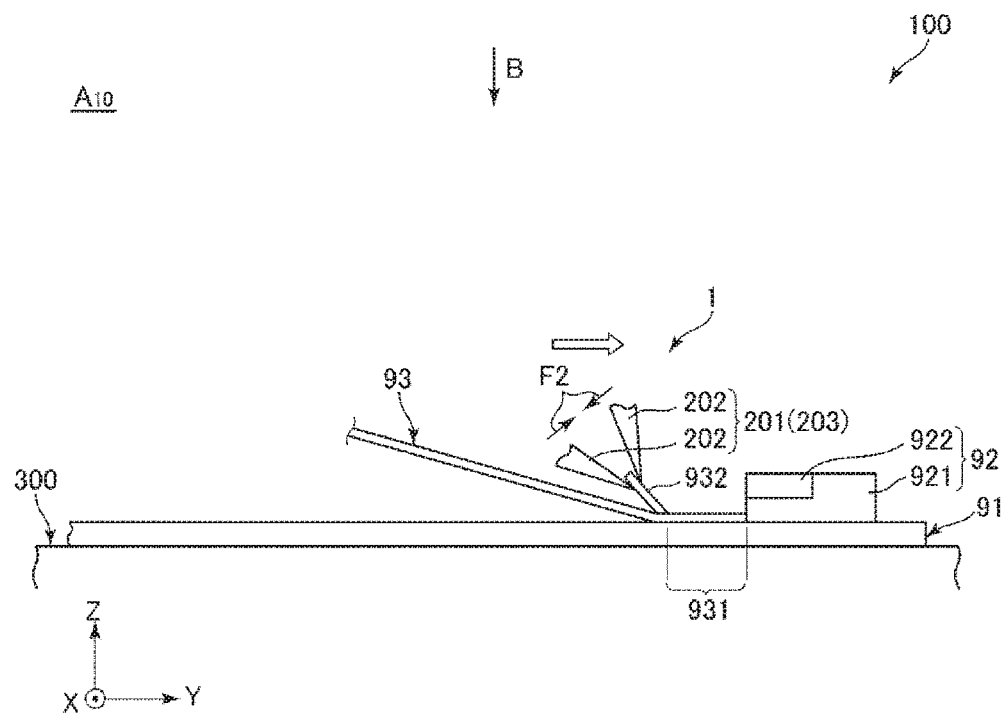
FIG. 4 is a side view sequentially showing an action state of the robot when the robot system shown in FIG. 1 executes the coupling method shown in FIG. 2.

As shown in FIG. 4, the gripping unit 201 grips the cable 93 with a second gripping force F2 smaller than the first gripping force F1. Hereinafter, the state is referred to as "second gripping state". The second gripping force F2 may also be referred to as second nipping force for nipping the tab 932, and preferably has magnitude such that, when an external force is applied to the coupling end portion 931 of the cable 93, the tab 932 may slidingly move, that is, slide between the pair of nipping pieces 202.

Figure 14:
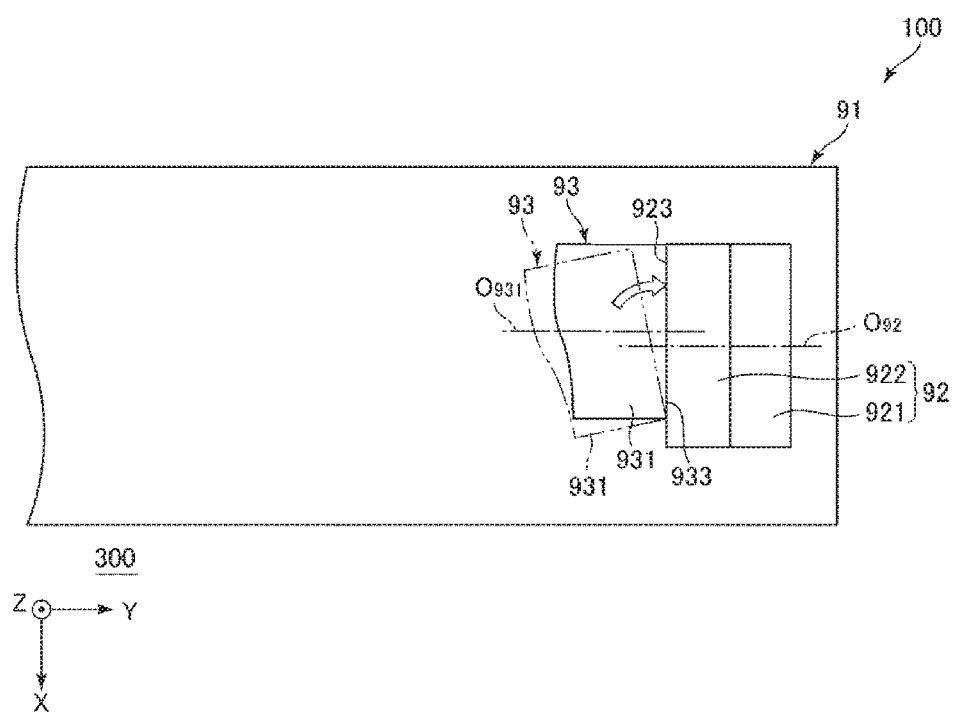
FIG. 14 is a view as seen in a direction of an arrow B in FIG. 4.

At the correction step, first, the coupling end portion 931 of the cable 93 is moved along the planer direction of the board 91 in the second gripping state toward the connector 92 to the positive side in the Y-axis direction. Then, the coupling end portion 931 is further moved, and thereby, as shown in FIG. 14, the end surface 933 of the coupling end portion 931 is pressed against an end surface 923 of the connector main body 921 at the negative side in the Y-axis direction. Because of the pressing (pressing action) in cooperation with being in the second gripping state, the end surface 933 of the coupling end portion 931 is moved to fit with the end surface 923 of the connector main body 921, and the center line $O_{931}$ of the coupling end portion 931 becomes parallel to the center line $O_{92}$ of the connector 92. Thereby, the correction action to correct the cable 93 to be insertable into the connector 92 is performed.

During the correction action, the coupling end portion 931 of the cable 93 comes into contact with the connector main body 921 of the connector 92 and a force acts on the gripping unit 201. The force is detected by the force detection unit 19. Then, the control apparatus 200 controls a time to stop the correction action based on a detection result in the force detection unit 19. For example, when the force detected by the force detection unit 19 reaches a second threshold value, the apparatus stops the correction action.

Further, at the correction step, the correction action is performed with the tab 932 of the cable 93 nipped so that the nipping directions by the nipping part 203 may be along the upward and downward directions. Thereby, when the end surface 933 of the coupling end portion 931 is pressed against the end surface 923 of the connector main body 921, the end surface 933 of the coupling end portion 931 may stably fit with the end surface 923 of the connector main body 921.

[4] Retraction Step

Figure 5:
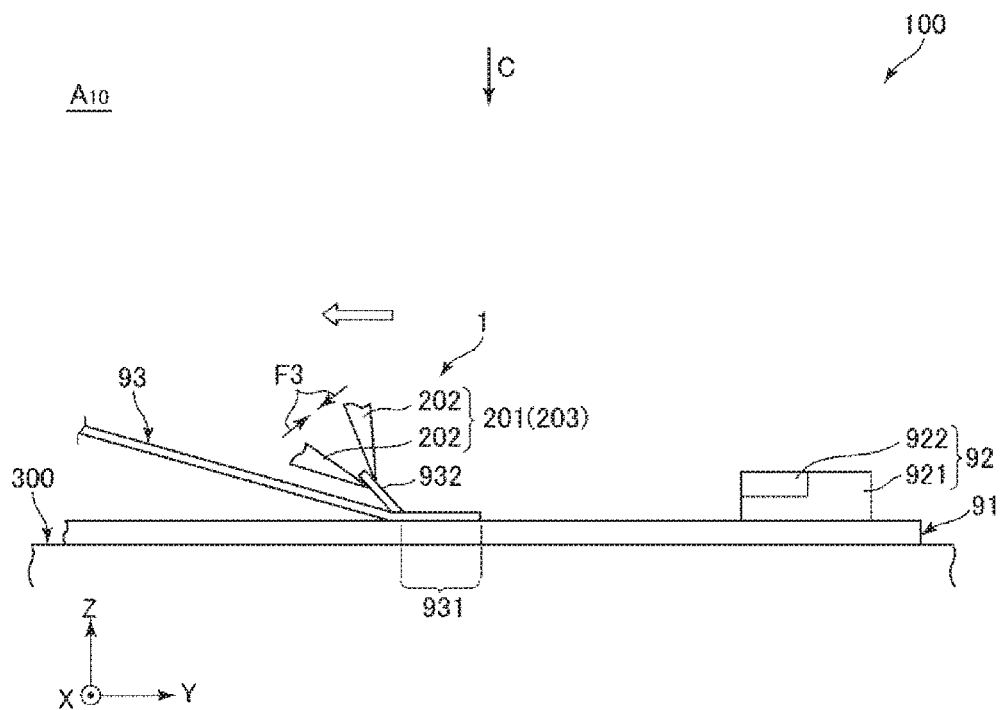
FIG. 5 is a side view sequentially showing an action state of the robot when the robot system shown in FIG. 1 executes the coupling method shown in FIG. 2.
Figure 15:
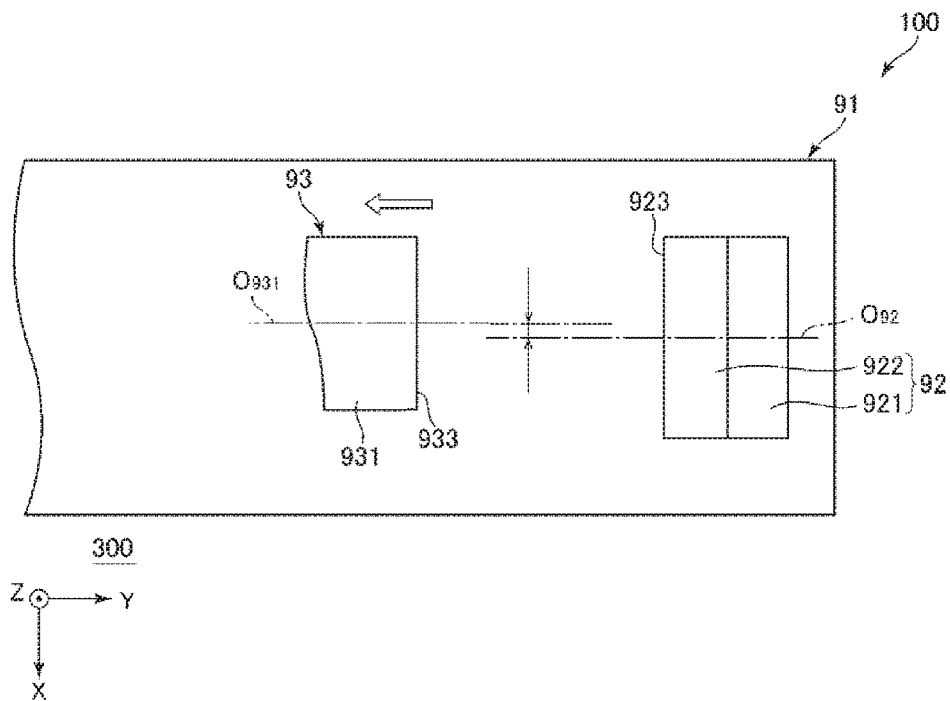
FIG. 15 is a view as seen in a direction of an arrow C in FIG. 5.

As shown in FIG. 5, the gripping unit 201 grips the cable 93 with a third gripping force F3 larger than the second gripping force F2. Thereby, as shown in FIG. 15, the state in which the center line $O_{931}$ of the coupling end portion 931 and the center line $O_{92}$ of the connector 92 are parallel is maintained. Hereinafter, the state is referred to as "third gripping state". The third gripping force F3 may also be referred to as third nipping force for nipping the tab 932, and may have the same magnitude as or a different magnitude from the first gripping force F1. For example, in the case where the third gripping force F3 is larger than the first gripping force F1, when the cable 93 is inserted into the connector 92 in the insertion step, the cable is gripped by the gripping unit 201 more strongly, and thereby, changes in position relationship between the cable 93 and the gripping unit 201 by the force from the connector 92 may be suppressed.

The retraction step is a step at which the retraction action to once retract the coupling end portion 931 of the cable 93 from the connector 92 is performed in the third gripping state. Note that the retraction position of the coupling end portion 931 is not particularly limited, but may be e.g. the same position as the position of the coupling end portion 931 in FIG. 3 in the Y-axis directions. Thereby, at the alignment step as the next step, a gray-scaled image showing the position relationship between the cable 93 and the connector 92 may be captured.

[5] Alignment Step

At the alignment step, first, the coupling end portion 931 of the cable 93 gripped by the gripping unit 201 and the connector 92 are imaged together by the imaging unit 21, and thereby, a gray-scaled image showing the position relationship is obtained. Then, in the control apparatus 200, binarization processing is performed on the gray-scaled image and an amount of misalignment between the center line $O_{931}$ of the coupling end portion 931 and the center line $O_{92}$ of the connector 92 in the X-axis directions may be detected. Note that, at the alignment step, the processing is not limited to the binarization processing on the gray-scaled image, but e.g. matching processing of the coupling end portion 931 may be performed for the same purpose.

Figure 6:
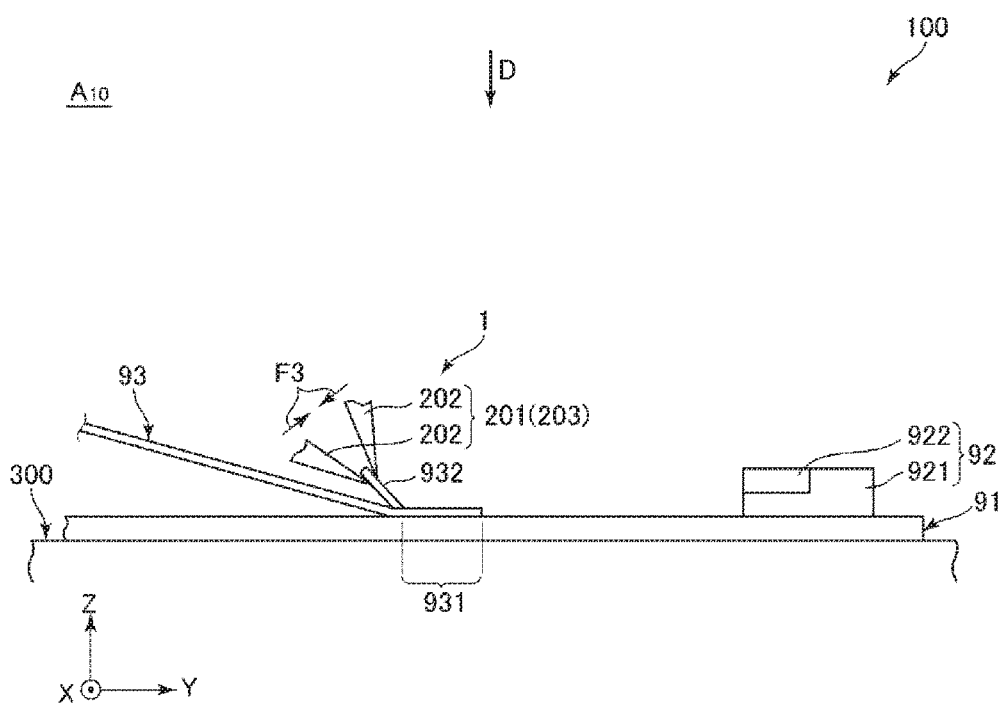
FIG. 6 is a side view sequentially showing an action state of the robot when the robot system shown in FIG. 1 executes the coupling method shown in FIG. 2.
Figure 16:
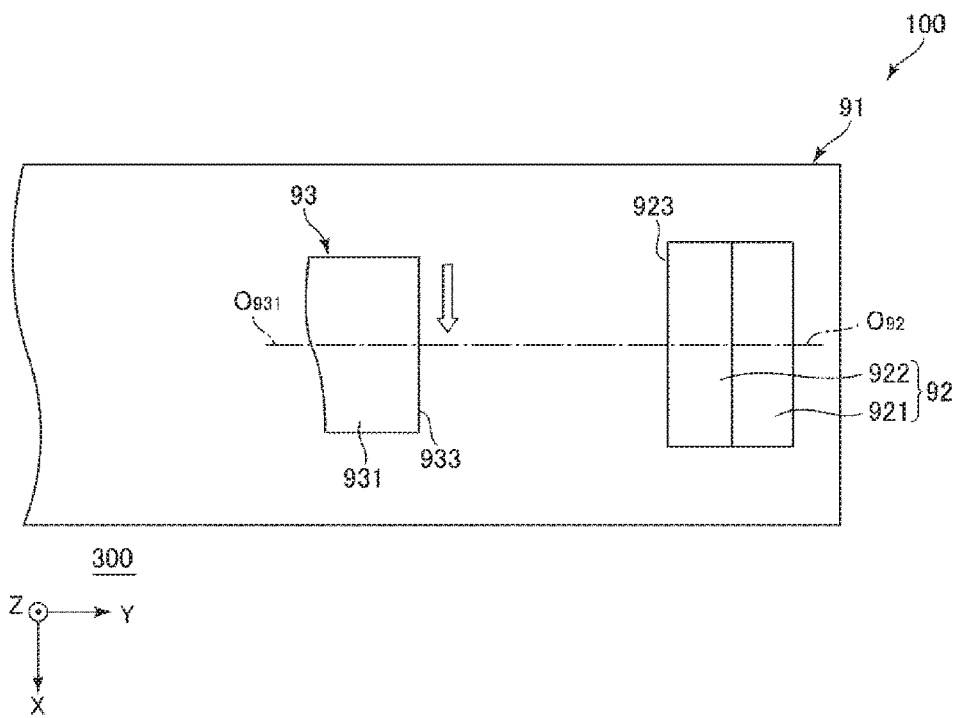
FIG. 16 is a view as seen in a direction of an arrow D in FIG. 6.

Then, remaining in the third gripping state shown in FIG. 6, the gripping unit 201 is moved toward the positive side in the X-axis direction by the amount of misalignment together with the coupling end portion 931. Thereby, as shown in FIG. 16, in a plan view in a thickness direction of the board 91, the center line $O_{931}$ of the coupling end portion 931 and the center line $O_{92}$ of the connector 92 are located in the same straight line, and alignment between the cable 93 and the connector 92 is completed. Hereinafter, the state is referred to as "aligned state". The aligned state is maintained until the coupling action by the robot system 100 is completed. Alternatively, for example, alignment may be performed by matching of the relationship between the position of the coupling end portion 931 and the position of the connector 92 from the gray-scaled image obtained by the imaging unit 21.

As described above, the robot 1 has the imaging unit 21 that images the cable 93 gripped by the gripping unit 201 and the connector 92.

Then, at the alignment step between the correction action and the insertion action, the control apparatus 200 may control the robot 1 to perform the alignment action to align between the cable 93 gripped by the gripping unit 201 and the connector 92 based on the imaging result in the imaging unit 21 with the cable 93 once separated from the connector 92. Thereby, the insertion step of inserting the cable 93 into the connector 92 may be smoothly performed.

[6] Lid Opening Step

Figure 7:
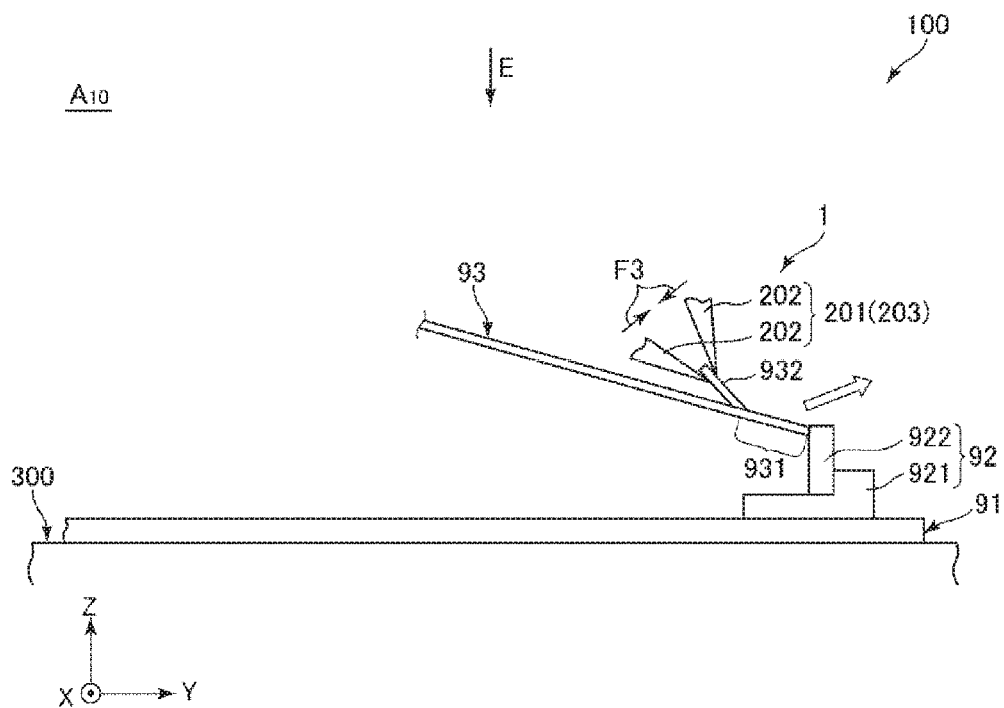
FIG. 7 is a side view sequentially showing an action state of the robot when the robot system shown in FIG. 1 executes the coupling method shown in FIG. 2.

As shown in FIG. 7, the lid opening step is a step at which the lid opening action to open the closed lid body 922 is performed. At the lid opening step, the coupling end portion 931 of the cable 93 is engaged with the closed lid body 922 in the third gripping state, and the engaged coupling end portion 931 is moved toward the upper right in FIG. 7. Thereby, the lid body 922 may be opened. A program for the lid opening action is stored in a memory unit 202B of the control apparatus 200 in advance.

Figure 17:
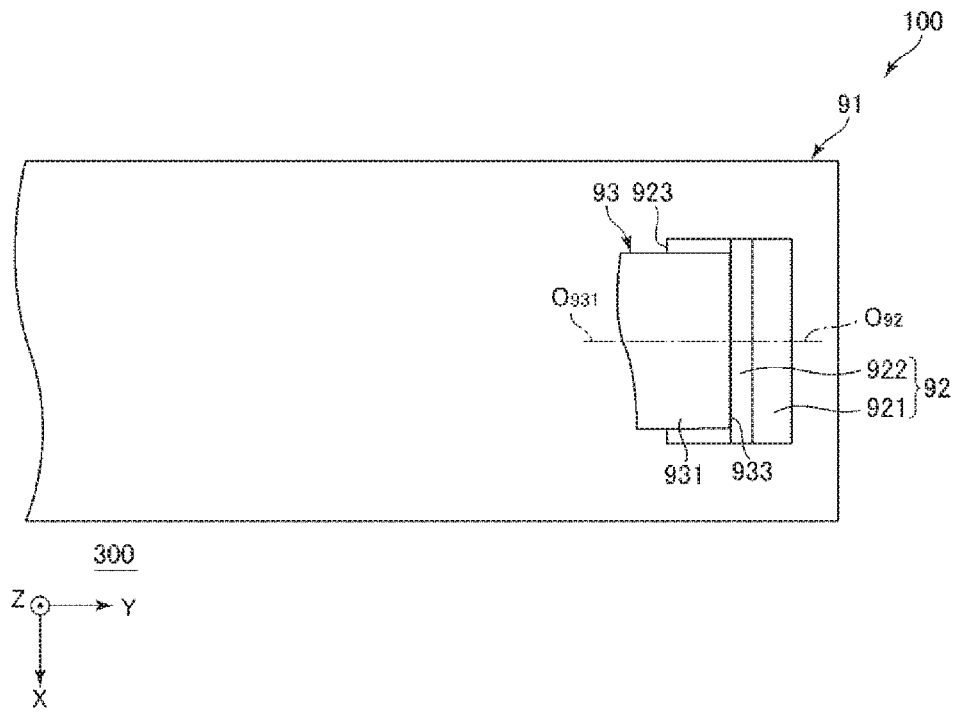
FIG. 17 is a view as seen in a direction of an arrow E in FIG. 7.

After the lid opening action, as shown in FIG. 17, the aligned state is still maintained.

[7] Insertion Step

Figure 8:
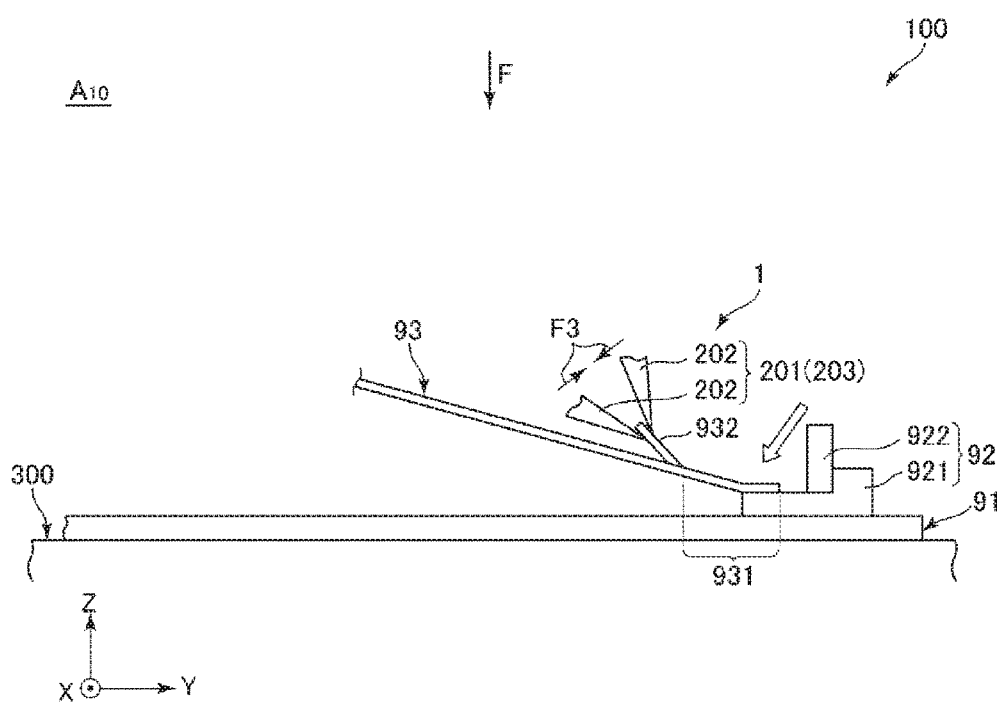
FIG. 8 is a side view sequentially showing an action state of the robot when the robot system shown in FIG. 1 executes the coupling method shown in FIG. 2.
Figure 9:
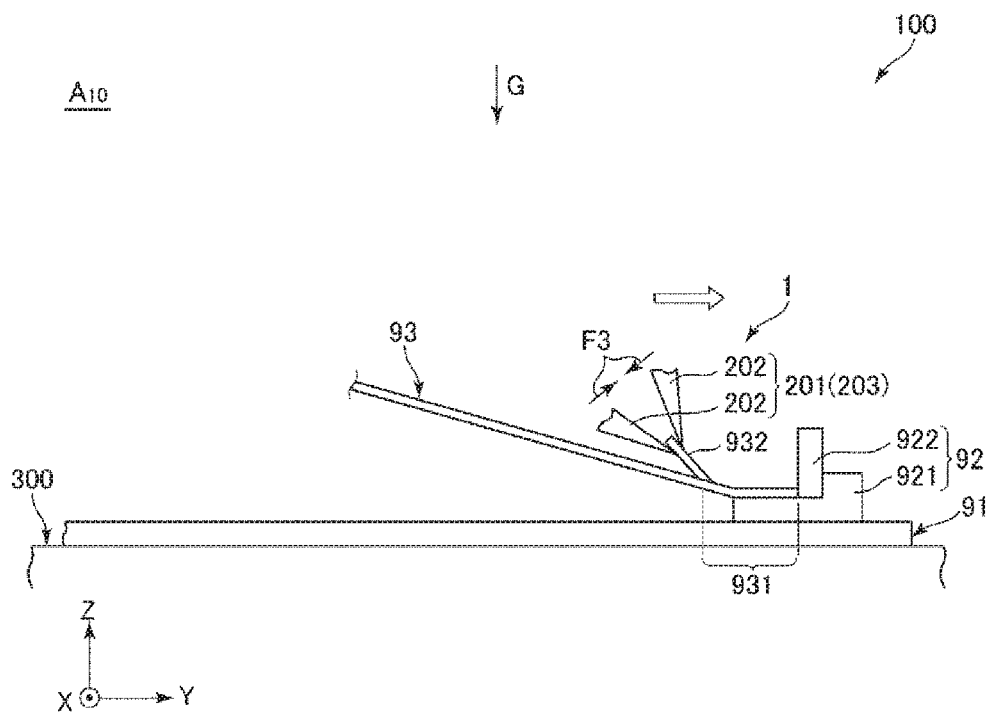
FIG. 9 is a side view sequentially showing an action state of the robot when the robot system shown in FIG. 1 executes the coupling method shown in FIG. 2.

As shown in FIGS. 8 and 9, the insertion step is a step in which the insertion action to insert the cable 93 into the connector 92 is performed in the third gripping state.

Figure 18:
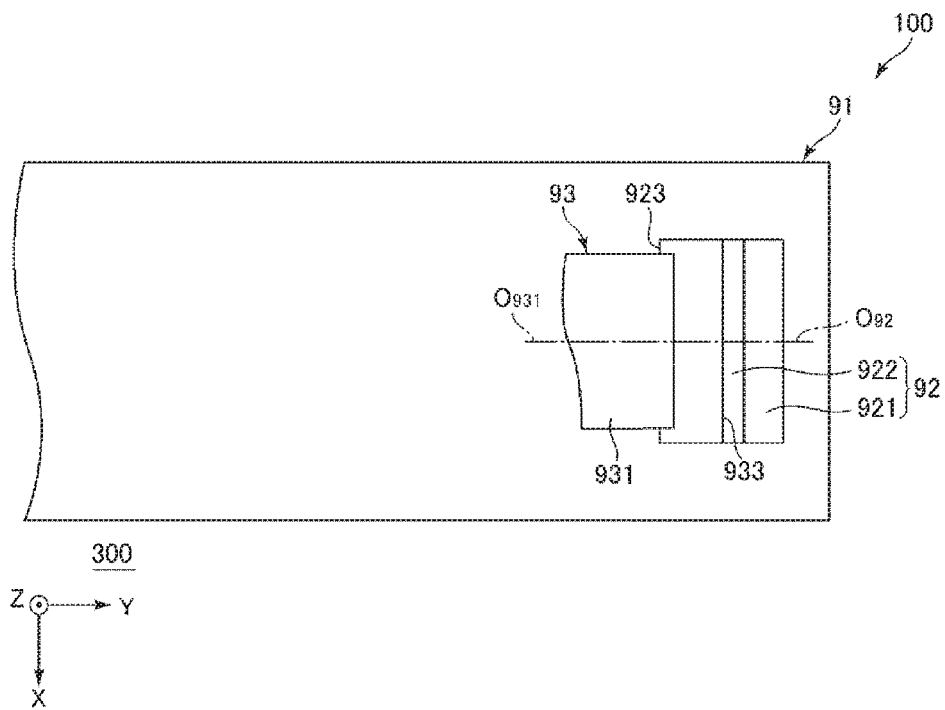
FIG. 18 is a view as seen in a direction of an arrow F in FIG. 8.
Figure 19:
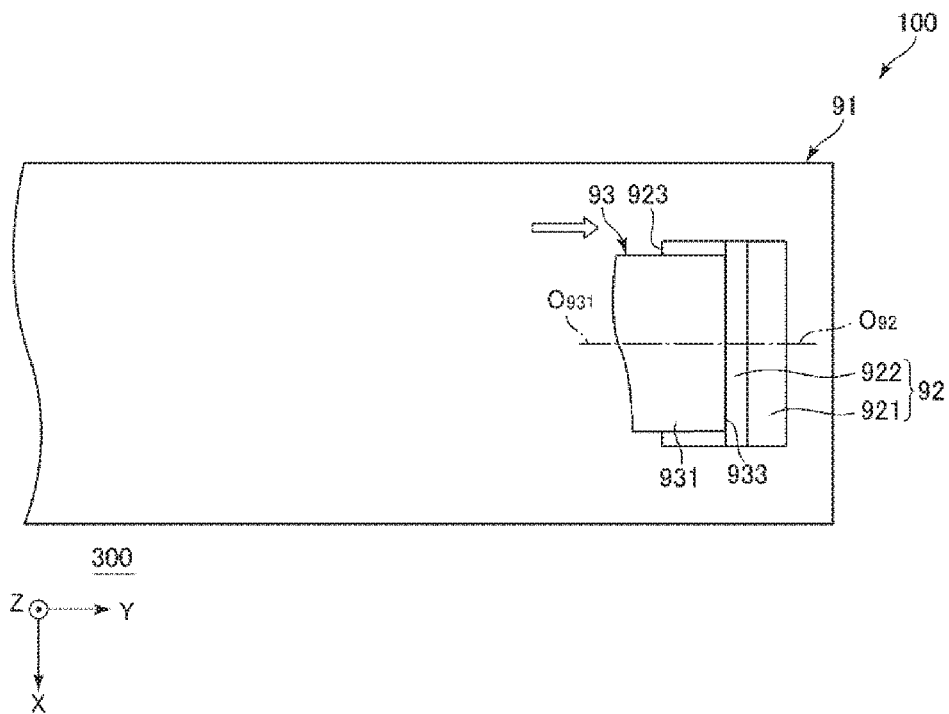
FIG. 19 is a view as seen in a direction of an arrow G in FIG. 9.

At the insertion step, first, as shown in FIG. 18, a part of the coupling end portion 931 of the cable 93 at the end surface 933 side is mounted on the connector main body 921 in the third gripping state. Concurrently, the coupling end portion 931 of the cable 93 comes into contact with the connector main body 921 and a force acts thereon. The force is detected by the force detection unit 19. Then, the control apparatus 200 controls a time to stop the movement of the cable 93 based on a detection result in the force detection unit 19. Then, as shown in FIG. 19, the coupling end portion 931 of the cable 93 is moved on the connector main body 921 along the planer direction of the board 91, particularly, the positive side in the Y direction remaining in the third gripping state.

During the insertion action, the coupling end portion 931 of the cable 93 comes into contact with the connector main body 921 of the connector 92 and a force acts on the gripping unit 201. The force is detected by the force detection unit 19. Then, the control apparatus 200 controls a time to stop the insertion action based on a detection result in the force detection unit 19. For example, when the force detected by the force detection unit 19 reaches a third threshold value in the position in which the coupling end portion 931 is in contact with the opened lid body 922, the apparatus stops the insertion action. Alternatively, for example, in the insertion action, the coupling end portion 931 of the cable 93 may be inserted while the coupling end portion 931 of the cable 93 is moved toward the positive side in the X direction, the negative side in the X direction, the positive side in the Z direction, and the negative side in the Z direction so that the force acting thereon from the connector 92 may be smaller.

Also, at the insertion step, the insertion action is performed with the tab 932 of the cable 93 nipped so that the nipping directions by the nipping part 203 may be along the upward and downward directions. Thereby, the aligned state may be stably maintained, and thus, the insertion action may be smoothly performed. Then, after the insertion action, the cable 93 and the connector 92 are electrically coupled.

[8] Lid Closing Step

Figure 10:
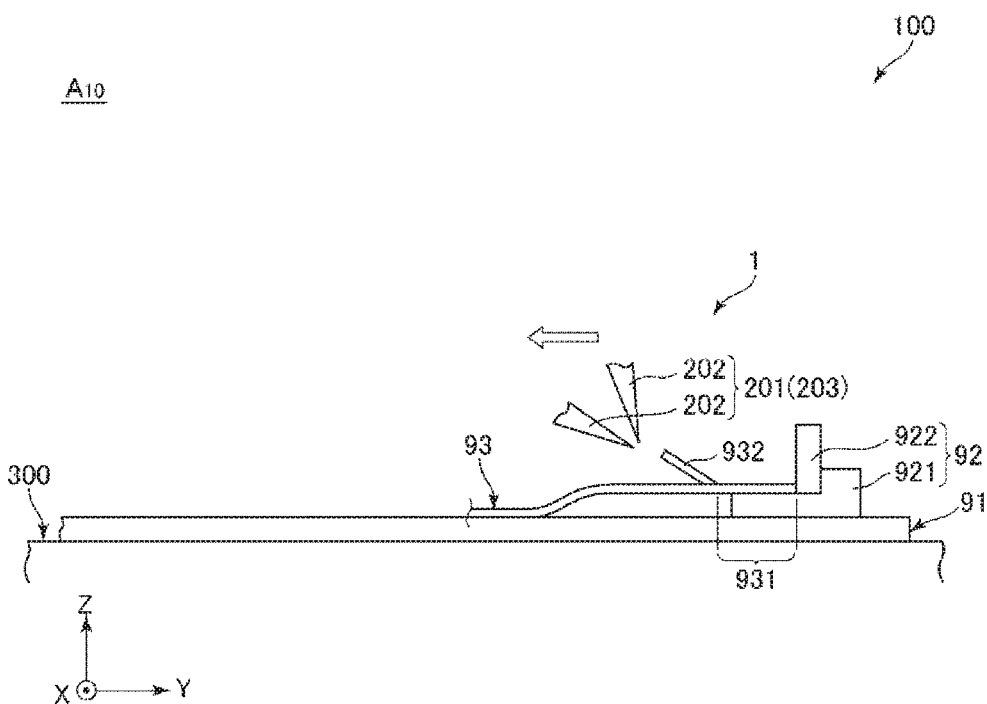
FIG. 10 is a side view sequentially showing an action state of the robot when the robot system shown in FIG. 1 executes the coupling method shown in FIG. 2.
Figure 11:
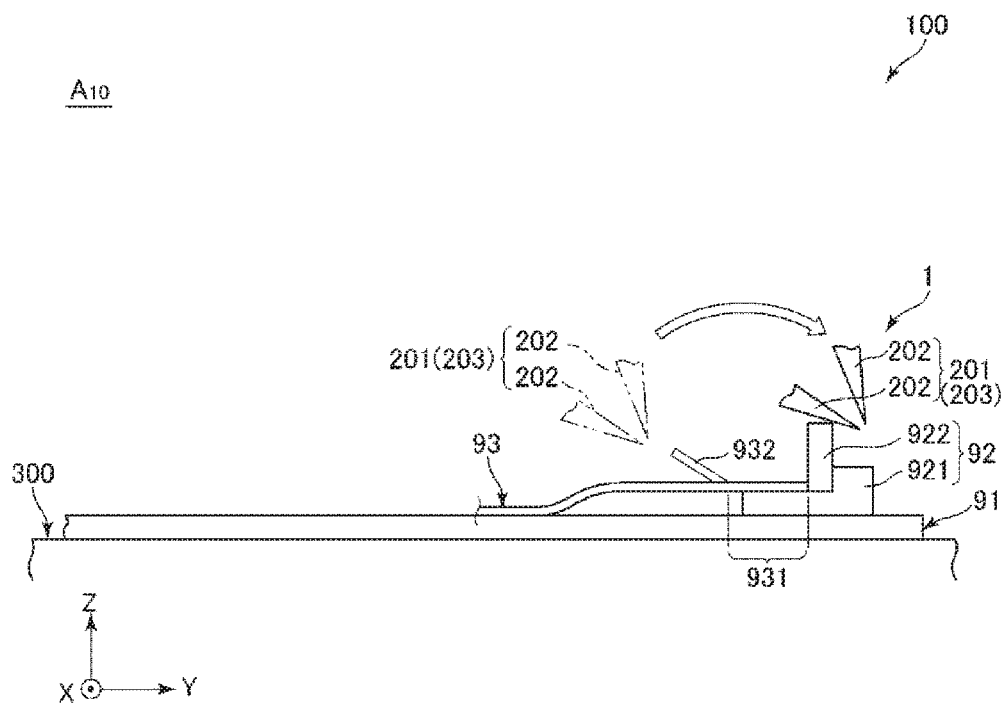
FIG. 11 is a side view sequentially showing an action state of the robot when the robot system shown in FIG. 1 executes the coupling method shown in FIG. 2.

As shown in FIGS. 10 to 12, the lid closing step is a step in which the lid closing action to close the opened lid body 922 is performed.

In the lid closing action, first, as shown in FIG. 10, the third gripping state is released and the gripping unit 201 is moved toward the negative side in the Y-axis direction. Thereby, the gripping unit 201 is separated from the tab 932 of the cable 93. Then, as shown in FIG. 11, the gripping unit 201 is engaged with the opened lid body 922 from the positive side in the Y-axis direction. Then, as shown in FIG. 12, the gripping unit 201 is moved toward the negative side in the Y-axis direction. Thereby, as shown in FIG. 20, the lid body 922 may be closed, and thus, the electronic component assembly 9 is obtained. A program for the lid closing action is stored in the memory unit 202B of the control apparatus 200 in advance. Note that, in the lid closing action, the lid body 922 may be closed by another robot (not shown) than the robot 1 with the third gripping state maintained, or a tool for the lid closing action may be attached to the robot 1 and the lid body 922 may be closed by the tool.

As described above, the connector 92 has the openable lid body 922.

Then, when the lid body 922 was closed, at the lid opening step between the correction step and the insertion step, the control apparatus 200 may control the robot 1 to perform the lid opening action to open the lid body 922. Further, at the lid closing step after the lid opening action, the control apparatus 200 may control the robot 1 to perform the lid closing action to close the lid body 922. Thereby, even when the connector 92 has the lid body 922, the connector 92 and the cable 93 may be smoothly coupled.

As described above, when the cable 93 is coupled to the connector 92, for example, if the center line $O_{931}$ of the coupling end portion 931 is inclined relative to the center line $O_{92}$ of the connector 92 as shown in FIG. 13 before the coupling, the center line $O_{931}$ of the coupling end portion 931 and the center line $O_{92}$ of the connector 92 may be made parallel to each other by the correction action at the correction step. Thereby, the cable 93 is corrected to be insertable into the connector 92.

Alternatively, after the correction step, as shown in FIG. 15, when the center line $O_{931}$ of the coupling end portion 931 and the center line $O_{92}$ of the connector 92 are misaligned in the plan view in the thickness direction of the board 91 (the center line $O_{931}$ of the coupling end portion 931 and the center line $O_{92}$ of the connector 92 do not coincide), the alignment action at the alignment step is performed, and thereby, the cable 93 and the connector 92 may be aligned and the aligned cable 93 may be smoothly inserted into the connector 92. Thereby, the coupling action is stably performed.

As described above, the control apparatus 200 controls the time to stop the conveyance action, the correction action, or the insertion action based on the detection result in the force detection unit 19. Thereby, the respective actions may be accurately performed without excess or deficiency.

The gripping unit 201 has the nipping part 203 that nips the cable 93.

As described above, in the conveyance action, the correction action, and the insertion action, the surface of the board 91 is held to be horizontal.

The control apparatus 200 controls the robot 1 to perform the conveyance action at the conveyance step, the correction action at the correction step, or the insertion action at the insertion step with the cable 93 nipped so that the nipping directions by the nipping part 203 may be the vertical directions i.e., upward and downward directions, that is, the cable 93 and the nipping part 203 may overlap in the plan view in the vertical direction. Thereby, the posture of the cable 93 relative to the board 91 may be stabilized, and thus, the respective actions may be accurately and smoothly performed.

Further, as described above, when controlling the robot 1 to perform the correction action at the correction step or the insertion action at the insertion step, the control apparatus 200 moves the cable 93 in a direction parallel to the surface of the board 91. Thereby, for example, because of the cable 93 nipped so that the nipping directions by the nipping part 203 may be the upward and downward directions, the posture of the cable 93 relative to the board 91 may be further stabilized. Thereby, the respective actions may be more accurately and smoothly performed.

As described above, the control unit 201A controls the actions of the robot 1 at the respective steps by force control. Generally, it is known that work of creating a control program for execution of force control requires skill. Accordingly, for example, for adjustment of action conditions including action speeds, etc. when the robot 1 acts at the respective steps, changes of the control program, particularly, changes of the virtual coefficient of inertia, the virtual coefficient of viscosity, and the virtual modulus of elasticity are necessary according to the adjustment, and the changing work of the control program is not easy depending on the degree of proficiency of a programmer.

Accordingly, in view of the circumstances, the robot system 100 is configured to easily perform changing work of the control program regardless of the degree of proficiency of the programmer. As below, the configuration and the function thereof will be explained.

Figure 21:
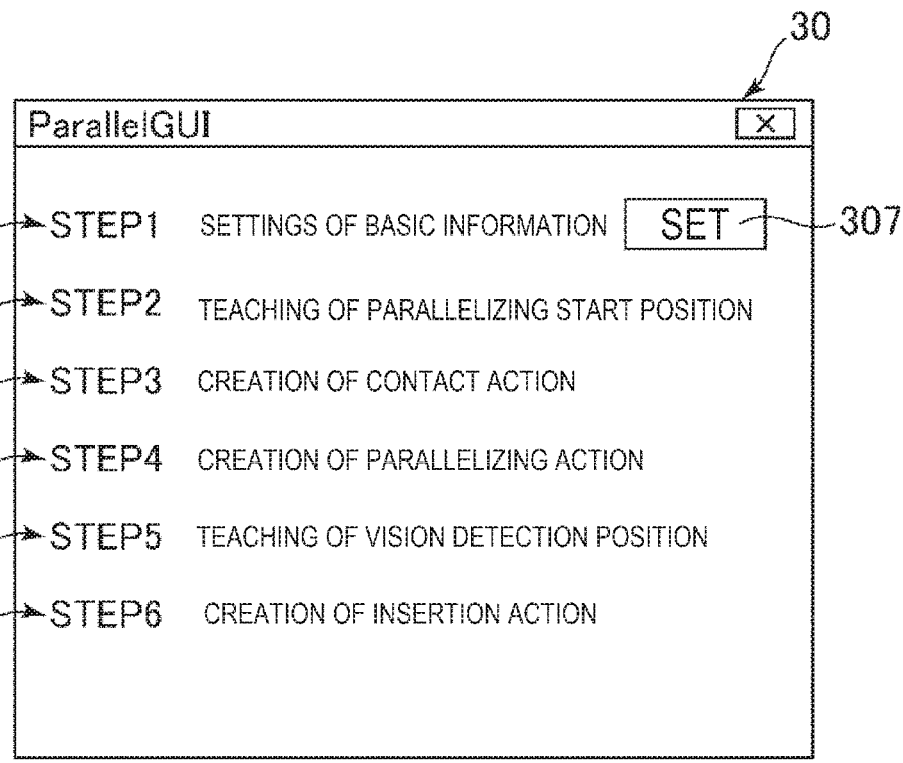
FIG. 21 shows an example of a setting window for setting action conditions of the robot when the robot system shown in FIG. 1 executes the coupling method shown in FIG. 2.
Figure 22:
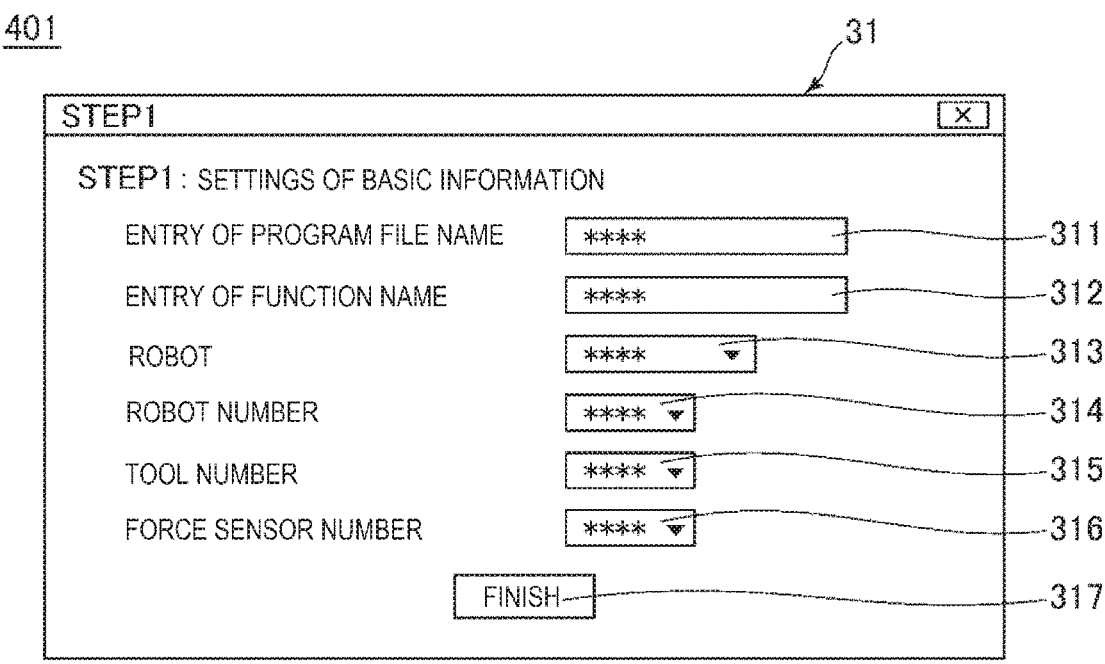
FIG. 22 shows an example of a setting window for setting action conditions of the robot when the robot system shown in FIG. 1 executes the coupling method shown in FIG. 2.
Figure 23:
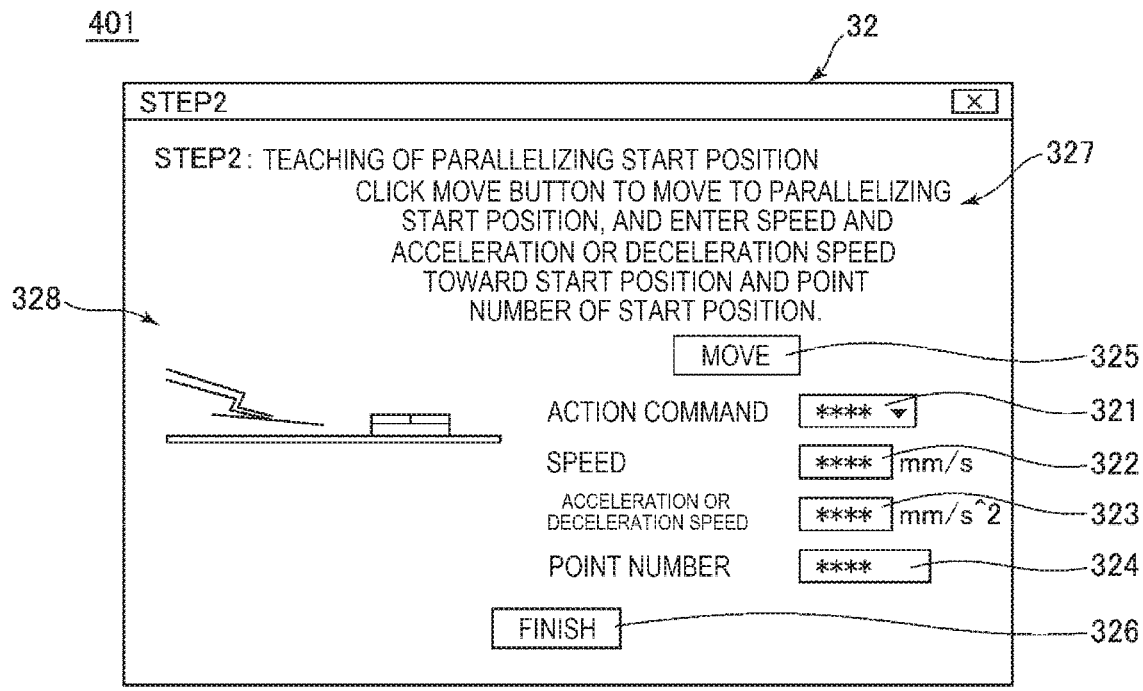
FIG. 23 shows an example of a setting window for setting action conditions of the robot when the robot system shown in FIG. 1 executes the coupling method shown in FIG. 2.
Figure 24:
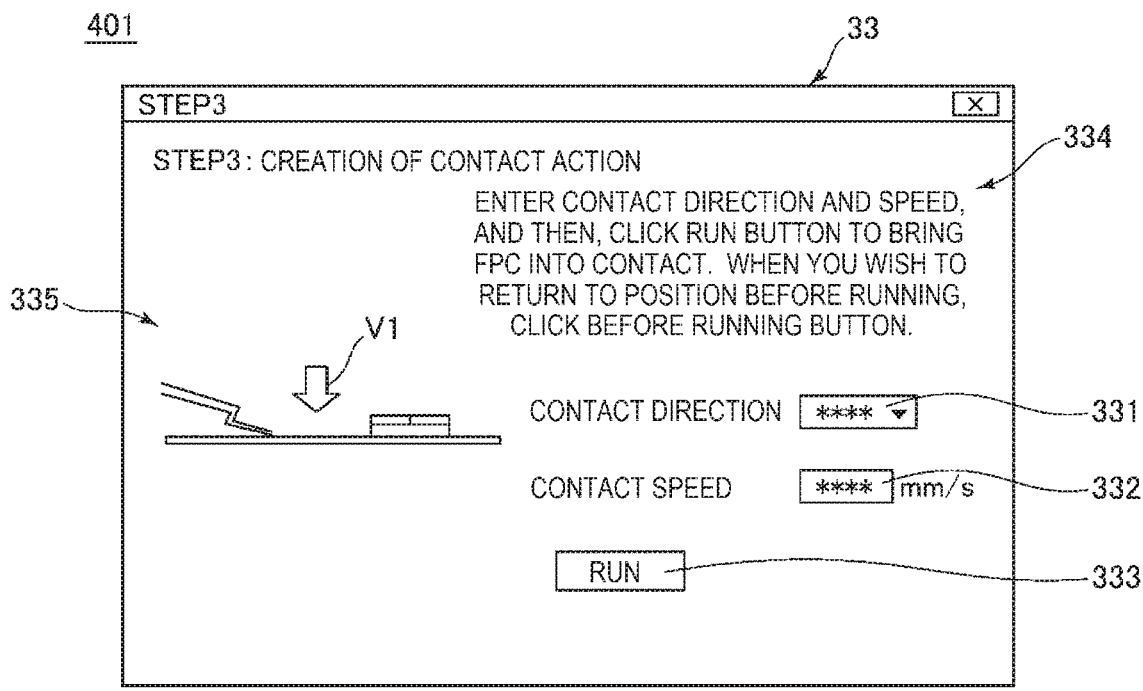
FIG. 24 shows an example of a setting window for setting action conditions of the robot when the robot system shown in FIG. 1 executes the coupling method shown in FIG. 2.
Figure 25:
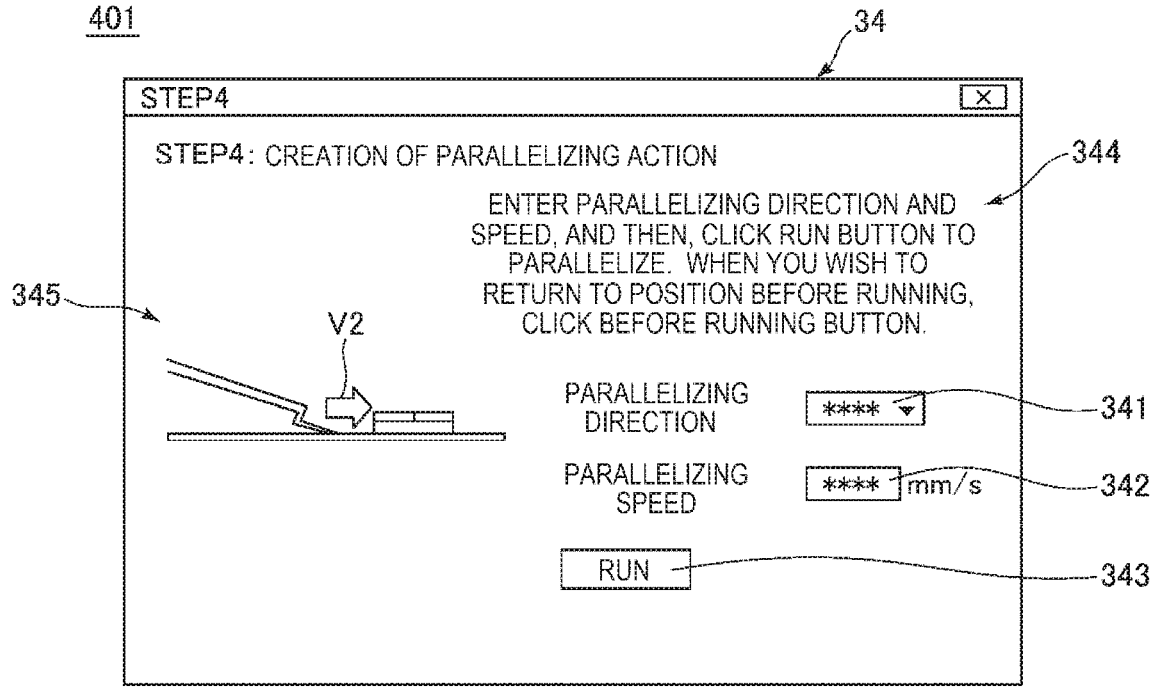
FIG. 25 shows an example of a setting window for setting action conditions of the robot when the robot system shown in FIG. 1 executes the coupling method shown in FIG. 2.
Figure 26:
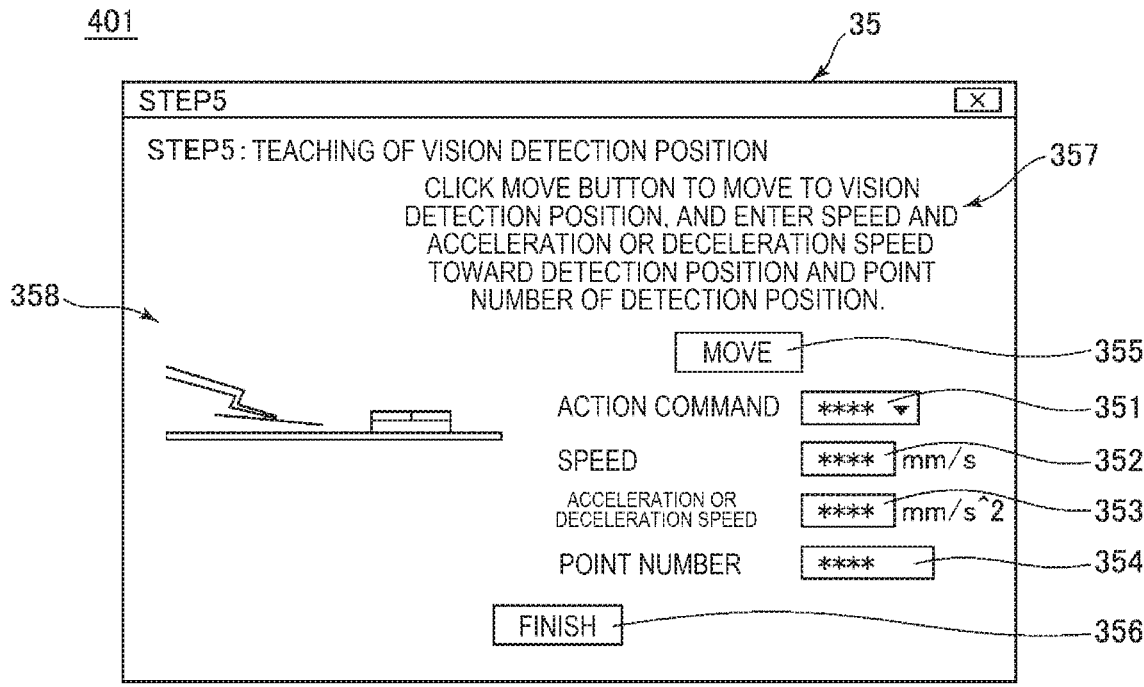
FIG. 26 shows an example of a setting window for setting action conditions of the robot when the robot system shown in FIG. 1 executes the coupling method shown in FIG. 2.
Figures 27, 28:
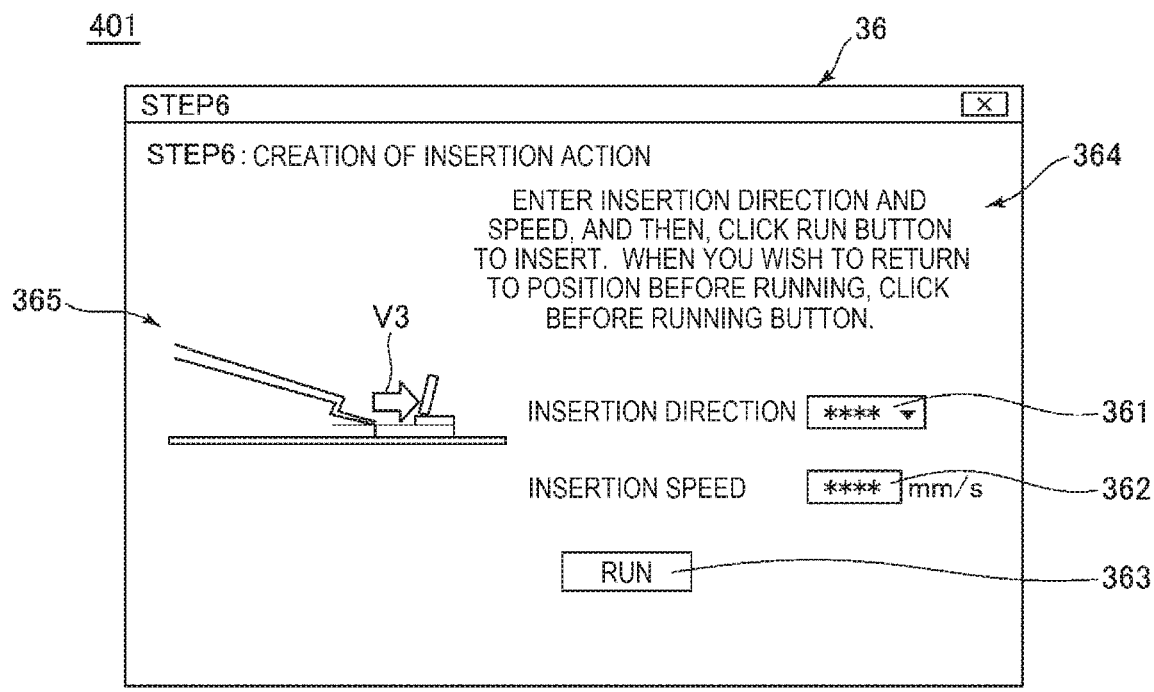
FIG. 27 shows an example of a setting window for setting action conditions of the robot when the robot system shown in FIG. 1 executes the coupling method shown in FIG. 2.
FIG. 28 shows an example of a setting window for setting action conditions of the robot when the robot system shown in FIG. 1 executes the coupling method shown in FIG. 2.

When action conditions including action speeds of the robot 1 at the respective steps are adjusted, a menu setting window 30 shown in FIG. 21, a first setting window 31 shown in FIG. 22, a second setting window 32 shown in FIG. 23, a third setting window 33 shown in FIG. 24, a fourth setting window 34 shown in FIG. 25, a fifth setting window 35 shown in FIG. 26, and a sixth setting window 36 shown in FIG. 27 are appropriately displayed on the display unit 401.

As shown in FIG. 21, the menu setting window 30 contains a first item 301 for "STEP1 Settings of Basic Information", a second item 302 for "STEP2 Teaching of Parallelizing Start Position", a third item 303 for "STEP3 Creation of Contact Action", a fourth item 304 for "STEP4 Creation of Parallelizing Action", a fifth item 305 for "STEP5 Teaching of Vision Detection Position", and a sixth item 306 for "STEP6 Creation of Insertion Action" as a menu. Further, the first item 301 to the sixth item 306 are placed sequentially from the top.

When the first item 301 is selected from the menu and a set button 307 is operated, the window may be transitioned to the first setting window 31. Similarly, when the second item 302 is selected, the window may be transitioned to the second setting window 32, when the third item 303 is selected, the window may be transitioned to the third setting window 33, when the fourth item 304 is selected, the window may be transitioned to the fourth setting window 34, when the fifth item 305 is selected, the window may be transitioned to the fifth setting window 35, and, when the sixth item 306 is selected, the window may be transitioned to the sixth setting window 36.

As shown in FIG. 22, the first setting window 31 contains a file name entry part 311, a function name entry part 312, a robot selection part 313, a robot number entry part 314, a tool number entry part 315, and a force sensor number entry part 316.

In the file name entry part 311, a file name of a control program for coupling work may be entered. In the function name entry part 312, a function name may be entered. In the robot selection part 313, the robot 1 to be used for coupling work may be selected. In the robot number entry part 314, a number of the robot 1 to be used for coupling work may be entered. In the tool number entry part 315, a number of the end effector 20, i.e., a tool to be attached to the robot 1 may be entered. In the force sensor number entry part 316, a number of the force detection unit 19 in the robot 1, i.e., a force sensor may be entered. Then, when these entries etc. are finished, a finish button 317 is operated. Thereby, the settings on the first setting window 31 are completed.

The second setting window 32 and the third setting window 33 are windows for setting action conditions in the conveyance action. The conveyance action is divided into two stages.

The first stage is an action to convey the cable 93 from the workbench on which the cable 93 was previously mounted and prepared to a position shown by dashed-two dotted lines in FIG. 3. In the second setting window 32, action conditions at the first stage may be set.

The second stage subsequent to the first stage is an action to convey the cable 93 to a position shown by solid lines in FIG. 3, i.e., a position in contact with the board 91. In the third setting window 33, action conditions at the second stage may be set.

As shown in FIG. 23, the second setting window 32 contains an action command selection part 321, a conveyance speed entry part 322, an acceleration or deceleration speed entry part 323, and a cable position entry part 324.

In the action command selection part 321, an action path in which the robot 1 acts at the first stage may be selected. In the conveyance speed entry part 322, a conveyance speed of the cable 93 at the first stage may be entered. In the acceleration or deceleration speed entry part 323, an acceleration or deceleration speed of the cable 93 at the first stage may be entered. In the cable position entry part 324, a position of the cable 93 when the first stage is finished, i.e., a position of the coupling end portion 931 of the cable 93 shown by dashed-two dotted lines in FIG. 3 may be entered.

Then, entries etc. in the action command selection part 321, the conveyance speed entry part 322, the acceleration or deceleration speed entry part 323, and the cable position entry part 324 may be performed after a move button 325 is operated. After these entries etc. are finished, a finish button 326 is operated. Thereby, the settings on the second setting window 32 are completed.

Note that, in the conveyance speed entry part 322 and the acceleration or deceleration speed entry part 323, upper limit values and lower limit values are respectively defined for the entry values and the entry values can be entered within the ranges.

In the robot system 100, a plurality of positions within a real space, i.e., the drive range $A_{10}$ in which the coupling work is performed is taught, and the respective position information is stored as point numbers in the memory unit 202B of the control apparatus 200. In the cable position entry part 324, the point number is entered, and thereby, the robot 1 may be moved to the position of the number.

As described above, the robot system 100 includes the cable position entry part 324 in which the position of the cable 93 on the board 91 at the first stage of the conveyance action is entered. Thereby, the position of the cable 93 when the first stage is finished may be accurately set to a position suitable for coupling of the connector 92 by the action after the first stage.

Further, the second setting window 32 contains a comment 327 describing an entry method in the second setting window 32, and an image 328 that represents the state shown in FIG. 3, particularly the state shown by the dashed-two dotted lines in FIG. 3.

As shown in FIG. 24, the third setting window 33 contains a conveyance direction selection part 331 and a conveyance speed entry part 332.

In the conveyance direction selection part 331, a direction in which the cable 93 at the first stage is conveyed to the position in contact with the board 91, i.e., a contact direction of the cable 93 with the board 91 may be selected. In the conveyance speed entry part 332, a conveyance speed V1 of the cable 93 at the second stage, i.e., a contact speed until the cable 93 comes into contact with the board 91 may be entered.

Then, entries etc. in the conveyance direction selection part 331 and the conveyance speed entry part 332 are finished, a run button 333 is operated. Thereby, the settings on the third setting window 33 are completed. When the run button 333 is operated, the robot 1 acts in the action conditions as entered in the third setting window 33.

Note that, in the third setting window 33, even when the entries etc. in the conveyance direction selection part 331 and the conveyance speed entry part 332 are finished, the respective entry contents may be appropriately changed before the operation of the run button 333. Further, after the operation of the run button 333, a finish button (not shown) may be provided. In this case, before the operation of the finish button, the entry contents in the conveyance direction selection part 331 and the conveyance speed entry part 332 may be further changed based on the operation of the run button 333.

The control apparatus 200 includes a determination unit 203C that can determine force control information necessary for force control at the second stage of the conveyance action according to the conveyance speed V1. The force control information includes e.g. the virtual coefficient of inertia, the virtual coefficient of viscosity, the virtual modulus of elasticity, and the target force. The virtual coefficient of inertia, the virtual coefficient of viscosity, and the virtual modulus of elasticity are the parameters expressed by the above described equation (A). The target force may be set to e.g. the first threshold value.

A calibration curve 4 is stored in the memory unit 202B of the control apparatus 200. As the calibration curve 4, for example, as shown in FIG. 28, a table 41 showing relationships among the conveyance speed V1, the virtual coefficient of inertia, the virtual coefficient of viscosity, the virtual modulus of elasticity, and the target force at the second stage may be used, however, a formula or graph may be used. Then, the run button 333 is operated, and thereby, the virtual coefficient of inertia, the virtual coefficient of viscosity, the virtual modulus of elasticity, and the target force are unambiguously determined according to the conveyance speed V1 at the time, i.e., the numerical value entered in the conveyance speed entry part 332. For example, when the conveyance speed V1 of a first row 411 in the table 41 is level "1", the virtual coefficient of inertia, the virtual coefficient of viscosity, the virtual modulus of elasticity, and the target force in the first row 411 are used for the force control at the second stage.

As described above, the robot system 100 includes the conveyance speed entry part 332 in which the conveyance speed V1 of the cable 93 to the board 91 at the second stage of the conveyance action is entered. Then, the determination unit 203C can determine the force control information at the second stage of the conveyance action according to the conveyance speed V1 based on the table 41 as the calibration curve 4. That is, the unit may determine the virtual coefficient of inertia, the virtual coefficient of viscosity, the virtual modulus of elasticity, and the target force suitable for the conveyance speed V1 at the second stage. Thereby, for adjustment of the conveyance speed V1 regardless of the degree of skill of a programmer, the determination unit 203C may accurately change and determine the virtual coefficient of inertia, the virtual coefficient of viscosity, the virtual modulus of elasticity, and the target force according to the adjustment.

Note that, in the conveyance speed entry part 332, an upper limit value and a lower limit value are defined for the entry value and the entry value can be entered within the range.

Further, the third setting window 33 contains a comment 334 describing an entry method etc. in the third setting window 33, and an image 335 that represents the state shown in FIG. 3, particularly the state shown by the solid lines in FIG. 3.

The fourth setting window 34 is a window for setting action conditions in the correction action. As shown in FIG. 25, the fourth setting window 34 contains a pressing direction selection part 341 as a pressing direction entry part and a pressing speed entry part 342.

In the pressing direction selection part 341, a pressing direction of the cable 93 against the connector 92 at the correction action, i.e., a parallelizing direction in which the end surface 933 of the cable 93 traces the end surface 923 of the connector 92 to be in parallel to the end surface 923 by pressing of the cable 93 against the connector 92 may be selected (pressing direction entry step). In the pressing speed entry part 342, a pressing speed V2 of the cable 93 at the correction action, i.e., a parallelizing speed until the end surface 933 of the cable 93 becomes parallel to the end surface 923 of the connector 92 may be entered (pressing speed entry step).

Then, entries etc. in the pressing direction selection part 341 and the pressing speed entry part 342 are finished, a run button 343 is operated. Thereby, the settings on the fourth setting window 34 are completed. When the run button 343 is operated, the robot 1 acts in the action conditions as entered in the fourth setting window 34.

Note that, in the fourth setting window 34, even when the entries etc. in the pressing direction selection part 341 and the pressing speed entry part 342 are finished, the respective entry contents may be appropriately changed before the operation of the run button 343. Further, after the operation of the run button 343, a finish button (not shown) may be provided. In this case, before the operation of the finish button, the entry contents in the pressing direction selection part 341 and the pressing speed entry part 342 may be further changed based on the operation of the run button 343.

The determination unit 203C of the control apparatus 200 may perform a force control information at correction action determination step of determining force control information necessary for force control in the correction action according to the pressing speed V2. The force control information includes e.g. the virtual coefficient of inertia, the virtual coefficient of viscosity, the virtual modulus of elasticity, and the target force like those for the conveyance speed V1. The virtual coefficient of inertia, the virtual coefficient of viscosity, and the virtual modulus of elasticity are the parameters expressed by the above described equation (A). The target force may be set to e.g. the second threshold value.

As the calibration curve 4 stored in the memory unit 202B of the control apparatus 200, for example, as shown in FIG. 29, a table 42 showing relationships among the pressing speed V2, the virtual coefficient of inertia, the virtual coefficient of viscosity, the virtual modulus of elasticity, and the target force may be used, however, a formula or graph may be used. Then, the run button 343 is operated, and thereby, the virtual coefficient of inertia, the virtual coefficient of viscosity, the virtual modulus of elasticity, and the target force are unambiguously determined according to the pressing speed V2 at the time, i.e., the numerical value entered in the pressing speed entry part 342. For example, when the pressing speed V2 of a first row 421 in the table 42 is level "1", the virtual coefficient of inertia, the virtual coefficient of viscosity, the virtual modulus of elasticity, and the target force in the first row 421 are used for the force control in the correction action.

As described above, the robot system 100 includes the pressing direction selection part 341 as the pressing direction entry part in which the pressing direction of the cable 93 against the connector 92 at the correction action is entered. Thereby, when the robot 1 is controlled to perform the correction action, the cable 93 may be accurately moved toward the connector 92.

As described above, the control unit 201A controls the robot 1 to grip the cable 93 using the gripping unit 201 and press the cable 93 against the connector 92 between the conveyance action and the insertion action, and thereby, can control the robot to perform the correction action to correct the cable 93 to be insertable in the connector 92 in the insertion action.

Further, the robot system 100 includes the pressing speed entry part 342 in which the pressing speed V2 of the cable 93 against the connector 92 at the correction action is entered. The determination unit 203C can determine the force control information at the correction action according to the pressing speed V2 based on the table 42 as the calibration curve 4. That is, the unit may determine the virtual coefficient of inertia, the virtual coefficient of viscosity, the virtual modulus of elasticity, and the target force suitable for the pressing speed V2. Thereby, for adjustment of the pressing speed V2 regardless of the degree of skill of a programmer, the determination unit 203C may accurately change and determine the virtual coefficient of inertia, the virtual coefficient of viscosity, the virtual modulus of elasticity, and the target force according to the adjustment.

Note that, in the pressing speed entry part 342, an upper limit value and a lower limit value are defined for the entry value and the entry value can be entered within the range.

Further, the fourth setting window 34 contains a comment 344 describing an entry method etc. in the fourth setting window 34, and an image 345 that represents the state shown in FIG. 4.

The fifth setting window 35 is a window for setting action conditions in the retraction action. As shown in FIG. 26, the fifth setting window 35 contains an action command selection part 351, a separation speed entry part 352, an acceleration or deceleration speed entry part 353, and a separation position entry part 354.

In the action command selection part 351, an action path in which the robot 1 performs the retraction action may be selected. In the separation speed entry part 352, a separation speed of the cable 93 from the connector 92 at the retraction action may be entered (separation speed entry step). In the acceleration or deceleration speed entry part 353, an acceleration or deceleration speed of the cable 93 at the retraction action may be entered. In the separation position entry part 354, a position of the cable 93 when the retraction action is finished, i.e., a position of the coupling end portion 931 of the cable 93 in FIG. 5 may be entered.

Then, entries etc. in the action command selection part 351, the separation speed entry part 352, the acceleration or deceleration speed entry part 353, and the separation position entry part 354 may be performed after a move button 355 is operated. After these entries etc. are finished, a finish button 356 is operated. Thereby, the settings on the fifth setting window 35 are completed.

Note that, in the separation speed entry part 352 and the acceleration or deceleration speed entry part 353, upper limit values and lower limit values are respectively defined for the entry values and the entry values can be entered within the ranges.

Further, in the separation position entry part 354, the point number is entered, and thereby, the robot 1 may be moved to the position of the number.

As described above, the robot 1 has the imaging unit 21 that images the gripping unit 201 gripping the cable 93 and the connector 92. Further, the control unit 201A can control the robot 1 to perform the alignment action to align the cable 93 gripped by the gripping unit 201 with the connector 92 based on the imaging result in the imaging unit 21 with the cable 93 once separated from the connector 92 between the correction action and the insertion action.

Further, the robot system 100 includes the separation speed entry part 352 in which the separation speed of the cable 93 when the cable 93 is once separated from the connector 92 prior to the alignment action is entered. Thereby, the separation speed may be set to a desired magnitude.

The robot system 100 includes the separation position entry part 354 in which the separation position of the cable 93 from the connector 92 is entered. Thereby, the position of the cable 93 when the retraction action is finished may be accurately set to a position suitable for coupling of the connector 92 by the subsequent action to the retraction action.

Further, the fifth setting window 35 contains a comment 357 describing an entry method in the fifth setting window 35, and an image 358 that represents the state shown in FIG. 3, particularly the state shown by the dashed-two dotted lines in FIG. 3.

The sixth setting window 36 is a window for setting action conditions in the insertion action. As shown in FIG. 27, the sixth setting window 36 contains an insertion direction selection part 361 as an insertion direction entry part and an insertion speed entry part 362.

In the insertion direction selection part 361, an insertion direction of the cable 93 into the connector 92 at the insertion action may be selected. In the insertion speed entry part 362, an insertion speed V3 of the cable 93 into the connector 92 at the insertion action may be entered. An insertion speed entry step is executed by the insertion speed entry part 362.

Then, entries etc. in the insertion direction selection part 361 and the insertion speed entry part 362 are finished, a run button 363 is operated. Thereby, the settings on the sixth setting window 36 are completed. When the run button 363 is operated, the robot 1 acts in the action conditions as entered in the sixth setting window 36.

Note that, in the sixth setting window 36, even when the entries etc. in the insertion direction selection part 361 and the insertion speed entry part 362 are finished, the respective entry contents may be appropriately changed before the operation of the run button 363. Further, after the operation of the run button 363, a finish button (not shown) may be provided. In this case, before the operation of the finish button, the entry contents in the insertion direction selection part 361 and the insertion speed entry part 362 may be further changed based on the operation of the run button 363.

The determination unit 203C of the control apparatus 200 performs a force control information at insertion action determination step of determining force control information necessary for force control in the insertion action according to the insertion speed V3. The force control information includes e.g. the virtual coefficient of inertia, the virtual coefficient of viscosity, the virtual modulus of elasticity, and the target force like those for the conveyance speed V1. The virtual coefficient of inertia, the virtual coefficient of viscosity, and the virtual modulus of elasticity are the parameters expressed by the above described equation (A). The target force may be set to e.g. the third threshold value.

As the calibration curve 4 stored in the memory unit 202B of the control apparatus 200, for example, as shown in FIG. 30, a table 43 showing relationships among the insertion speed V3, the virtual coefficient of inertia, the virtual coefficient of viscosity, the virtual modulus of elasticity, and the target force may be used, however, a formula or graph may be used. Then, the run button 363 is operated, and thereby, the virtual coefficient of inertia, the virtual coefficient of viscosity, the virtual modulus of elasticity, and the target force are unambiguously determined according to the insertion speed V3 at the time, i.e., the numerical value entered in the insertion speed entry part 362. For example, when the insertion speed V3 of a first row 431 in the table 43 is level "1", the virtual coefficient of inertia, the virtual coefficient of viscosity, the virtual modulus of elasticity, and the target force in the first row 431 are used for the force control in the insertion action.

As described above, the force control is the impedance control or the force trigger control. Further, the force control information is the virtual coefficient of inertia, the virtual coefficient of viscosity, or the virtual modulus of elasticity.

Further, the robot system 100 includes the memory unit 202B that stores the table 43 showing relationships among the insertion speed V3, the virtual coefficient of inertia, the virtual coefficient of viscosity, the virtual modulus of elasticity, and the target force, i.e., the calibration curve 4. The determination unit 203C can determine the virtual coefficient of inertia, the virtual coefficient of viscosity, or the virtual modulus of elasticity suitable for the insertion speed V3 based on the calibration curve 4. Thereby, for adjustment of the insertion speed V3 regardless of the degree of skill of a programmer, the determination unit 203C may accurately change and determine the virtual coefficient of inertia, the virtual coefficient of viscosity, and the virtual modulus of elasticity according to the adjustment.

The robot system 100 includes the insertion direction selection part 361 as the insertion direction entry part in which the insertion direction of the cable 93 into the connector 92 at the insertion action is entered. Thereby, when the robot 1 is controlled to perform the insertion action, the cable 93 may be accurately moved toward the connector 92.

Further, the robot system 100 includes the display unit 401 that displays the insertion speed entry part 362 and the insertion direction selection part 361 together. Thereby, entry work in the insertion speed entry part 362 and the insertion direction selection part 361 may be promptly performed on the display unit 401.

In the insertion speed entry part 362, an upper limit value and a lower limit value are defined for the entry value and the entry value can be entered within the range.

Further, the sixth setting window 36 contains a comment 364 describing an entry method etc. in the sixth setting window 36, and an image 365 that represents the state shown in FIG. 9.

As described above, the robot system 100 performs the coupling work of coupling the flexible cable 93 to the connector 92 provided on the board 91. The robot system 100 includes the robot 1 in which the gripping unit 201 that grips the cable 93 and the force detection unit 19 that detects the force acting on the gripping unit 201, the control unit 201A that controls the robot 1 to grip the cable 93 using the gripping unit 201 and perform the conveyance action to convey the cable 93 onto the board 91, and to grip the cable 93 using the gripping unit 201 and perform the insertion action to insert the cable 93 into the connector 92 by the force control based on the detection result in the force detection unit 19, the insertion speed entry part 362 in which the insertion speed V3 of the cable 93 into the connector 92 at the insertion action is entered, and the determination unit 203C that can determine the force control information necessary for the force control in the insertion action according to the insertion speed V3.

According to the present disclosure, as described above, the control program for the coupling work of coupling the connector 92 on the board 91 and the flexible cable 93 may be easily changed regardless of the degree of proficiency of the programmer.

Alternatively, in the robot system 100, the position of the cable 93 when the insertion action of the cable 93 is finished may be stored in the memory unit 202B and a judgement of success or failure of the insertion work of the cable 93 may be made based on the position. When a judgement of failure is made in the judgement of success or failure, the cable 93 may be moved to an initial position before execution of the second stage of the conveyance action.

Alternatively, a vision program creation step may be provided between the fifth item 305 (STEP5) and the sixth item 306 (STEP6). Here, "vision program" refers to a program for detection of the coupling end portion 931 of the cable 93 and the connector 92 and alignment of the center line $O_{931}$ of the coupling end portion 931 with the center line $O_{92}$ of the connector 92, i.e., coaxial positioning in the plan view.

Alternatively, in the case of the coupling work, when the center line $O_{931}$ of the coupling end portion 931 is aligned with the center line $O_{92}$ of the connector 92 without the settings of the second item 302 (STEP2), the third item 303 (STEP3), and the fourth item 304 (STEP4), the second item 302 (STEP2) to the fourth item 304 (STEP4) may be omitted.

Alternatively, in the case of the coupling work, when the height of the coupling end portion 931 of the cable 93 relative to the board 91 is stable, that is, when the flexure of the coupling end portion 931 is negligible, the third item 303 (STEP3) may be omitted.

Second Embodiment

As below, the second embodiment of the robot system and the coupling method according to the present disclosure will be explained with reference to FIGS. 31 to 33 with a focus on the differences from the above described embodiment, and the explanation of the same items will be omitted.

Figure 31:
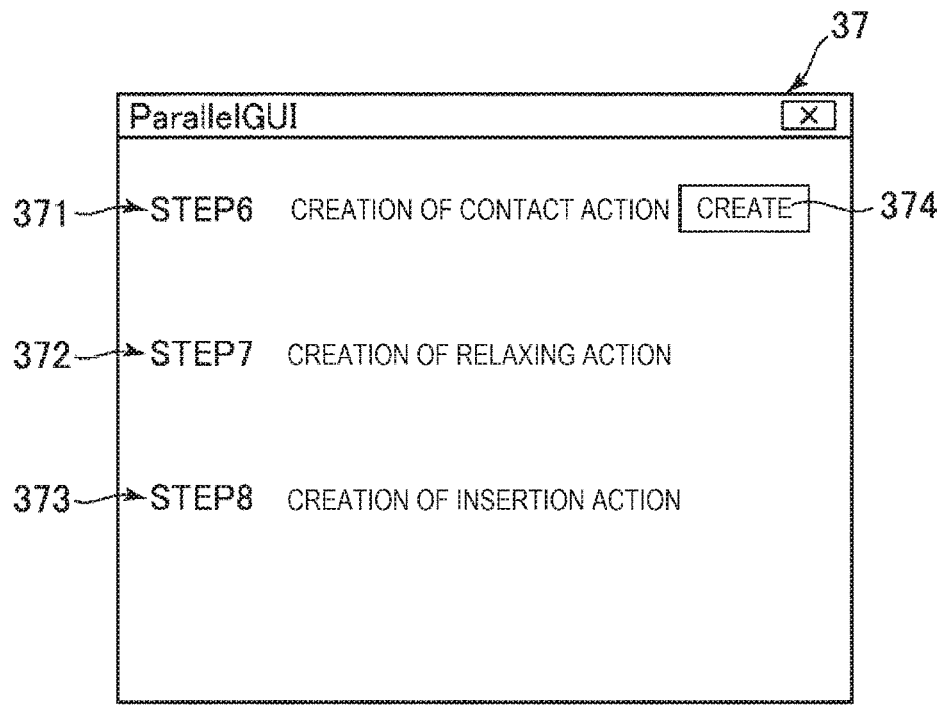
FIG. 31 shows an example of a setting window for setting action conditions of a robot when a robot system of a second embodiment executes a coupling method.
Figure 32:
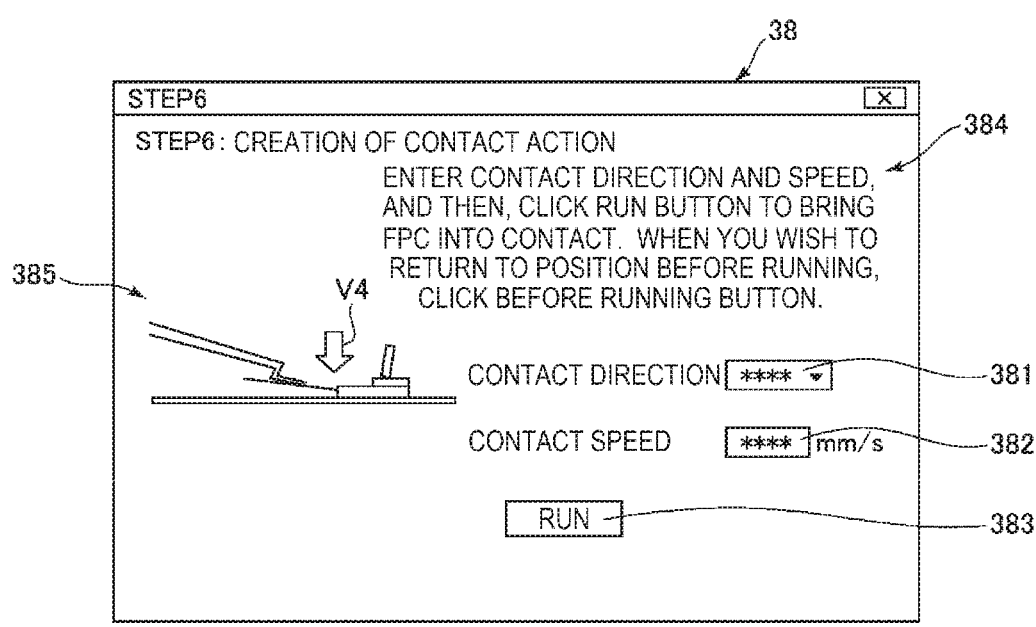
FIG. 32 shows an example of a setting window for setting action conditions of the robot when the robot system of the second embodiment executes the coupling method.
Figure 33:
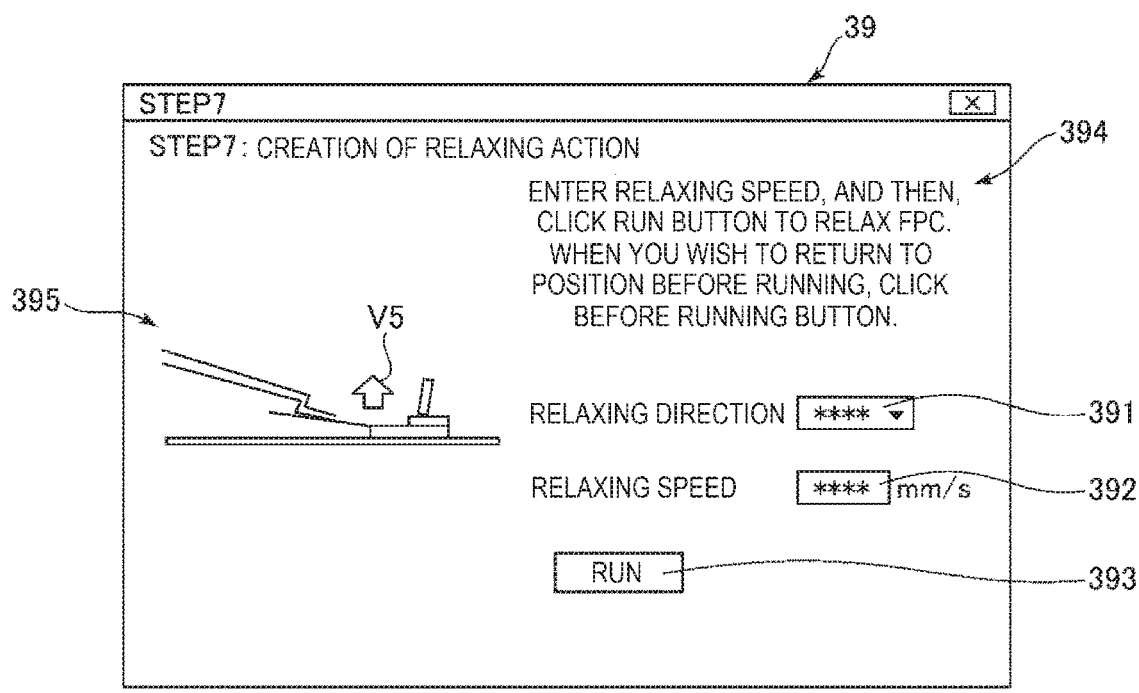
FIG. 33 shows an example of a setting window for setting action conditions of the robot when the robot system of the second embodiment executes the coupling method.

In the embodiment, for adjustment of the action conditions including action speeds of the robot 1, a menu setting window 37 shown in FIG. 31, a sixth setting window 38 shown in FIG. 32, and a seventh window 39 shown in FIG. 33 are appropriately displayed on the display unit 401. The configuration having these windows is effective for smooth and prompt coupling work when the height of the coupling end portion 931 of the cable 93 relative to the board 91 is unstable, that is, when the flexure of the coupling end portion 931 is non-negligible for coupling work.

As shown in FIG. 31, the menu setting window 37 contains a sixth item 371 for "STEP6 Creation of Contact Action", a seventh item 372 for "STEP7 Creation of Relaxing Action", and an eighth item 373 for "STEP8 Creation of Insertion Action". The sixth item 371 and the seventh item 372 follow the fifth item 305 described in the first embodiment. Further, as a result, the eighth item 373 is the postponed six item 306 and has the same contents as the sixth item 306.

When the sixth item 371 is selected from the menu and a creation button 374 is operated, the window may be transitioned to the sixth setting window 38 and, when the seventh item 372 is selected, the window may be transitioned to the seventh setting window 39.

The sixth setting window 38 is a window for setting action conditions in a contact action to bring the coupling end portion 931 of the cable 93 contact onto the connector main body 921 of the connector 92. As shown in FIG. 32, the sixth setting window 38 contains a contact direction selection part 381 and a contact speed entry part 382.

In the contact direction selection part 381, a contact direction of the cable 93 with the connector 92 at the contact action may be selected. In the contact speed entry part 382, a contact speed V4 of the cable 93 at the contact action may be entered.

Then, entries etc. in the contact direction selection part 381 and the contact speed entry part 382 are finished, a run button 383 is operated. Thereby, the settings on the sixth setting window 38 are completed. When the run button 383 is operated, the robot 1 acts in the action conditions as entered in the sixth setting window 38.

Note that, in the sixth setting window 38, even when the entries etc. in the contact direction selection part 381 and the contact speed entry part 382 are finished, the respective entry contents may be appropriately changed before the operation of the run button 383. Further, after the operation of the run button 383, a finish button (not shown) may be provided. In this case, before the operation of the finish button, the entry contents in the contact direction selection part 381 and the contact speed entry part 382 may be further changed based on the operation of the run button 383.

The determination unit 203C of the control apparatus 200 may determine force control information necessary for force control in the contact action according to the contact speed V4. The force control information includes e.g. the virtual coefficient of inertia, the virtual coefficient of viscosity, the virtual modulus of elasticity, and the target force like those for the conveyance speed V1.

Note that, in the contact speed entry part 382, an upper limit value and a lower limit value are defined for the entry value and the entry value can be entered within the range.

Further, the sixth setting window 38 contains a comment 384 describing an entry method etc. in the sixth setting window 38, and an image 385 that represents the actual contact action of the robot 1.

The seventh setting window 39 is a window for setting action conditions in a relaxing action to raise and relaxing the coupling end portion 931 of the cable 93 from the connector main body 921 of the connector 92. Here, "relaxing action" refers to an action to set the target force (target value) to "0". As shown in FIG. 33, the seventh setting window 39 contains a relaxing direction selection part 391 and a relaxing speed entry part 392.

In the relaxing direction selection part 391, a relaxing direction of the cable 93 relative to the connector 92 at the relaxing action may be selected. In the relaxing speed entry part 392, a relaxing speed V5 of the cable 93 at the relaxing action may be entered.

Then, entries etc. in the relaxing direction selection part 391 and the relaxing speed entry part 392 are finished, a run button 393 is operated. Thereby, the settings on the seventh setting window 39 are completed. When the run button 393 is operated, the robot 1 acts in the action conditions as entered in the seventh setting window 39.

Note that, in the seventh setting window 39, even when the entries etc. in the relaxing direction selection part 391 and the relaxing speed entry part 392 are finished, the respective entry contents may be appropriately changed before the operation of the run button 393. Further, after the operation of the run button 393, a finish button (not shown) may be provided. In this case, before the operation of the finish button, the entry contents in the relaxing direction selection part 391 and the relaxing speed entry part 392 may be further changed based on the operation of the run button 393.

The determination unit 203C of the control apparatus 200 may determine force control information necessary for force control in the relaxing action according to the relaxing speed V5. The force control information includes e.g. the virtual coefficient of inertia, the virtual coefficient of viscosity, the virtual modulus of elasticity, and the target force like those for the conveyance speed V1.

Note that, in the relaxing speed entry part 392, an upper limit value and a lower limit value are defined for the entry value and the entry value can be entered within the range.

Further, the seventh setting window 39 contains a comment 394 describing an entry method etc. in the seventh setting window 39, and an image 395 that represents the actual relaxing action of the robot 1.

According to the above described configuration, when the height of the coupling end portion 931 of the cable 93 relative to the board 91 is unstable for the coupling work, the coupling work may be smoothly and promptly performed.

Figure 34:
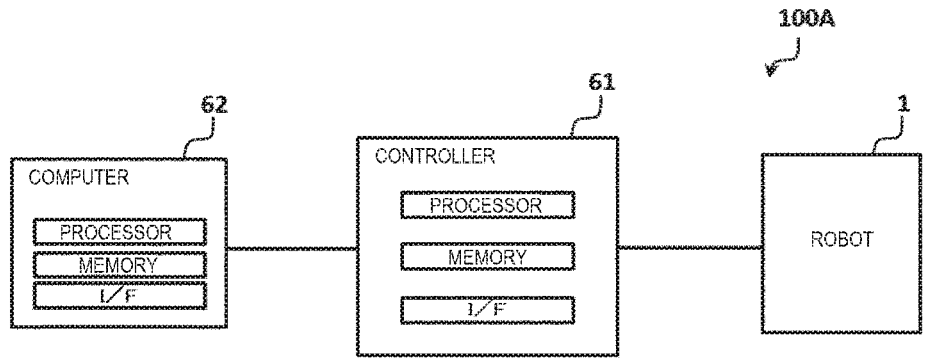
FIG. 34 is a block diagram for explanation of the robot system with a focus on hardware.

FIG. 34 is a block diagram for explanation of a robot system with a focus on hardware.

FIG. 34 shows an overall configuration of a robot system 100A in which the robot 1, a controller 61, and a computer 62 are coupled. The control of the robot 1 may be executed by reading commands in a memory using a processor in the controller 61 or executed via the controller 61 by reading commands in a memory using a processor in the computer 62.

Therefore, one or both of the controller 61 and the computer 62 may be regarded as "control apparatus 200".

Modified Example 1

Figure 35:
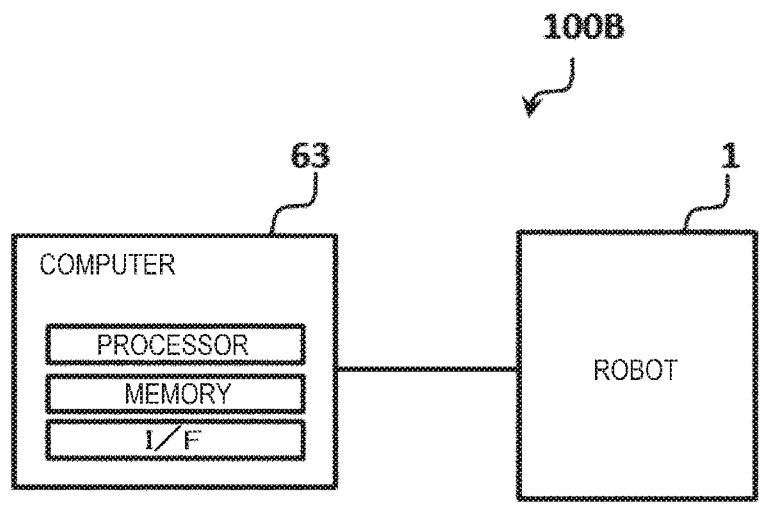
FIG. 35 is a block diagram showing modified example 1 with a focus on hardware of the robot system.

FIG. 35 is a block diagram showing modified example 1 with a focus on hardware of a robot system.

FIG. 35 shows an overall configuration of a robot system 100B in which a computer 63 is directly coupled to the robot 1. The control of the robot 1 is directly executed by reading commands in a memory using a processor in the computer 63.

Therefore, the computer 63 may be regarded as "control apparatus 200".

Modified Example 2

Figure 36:
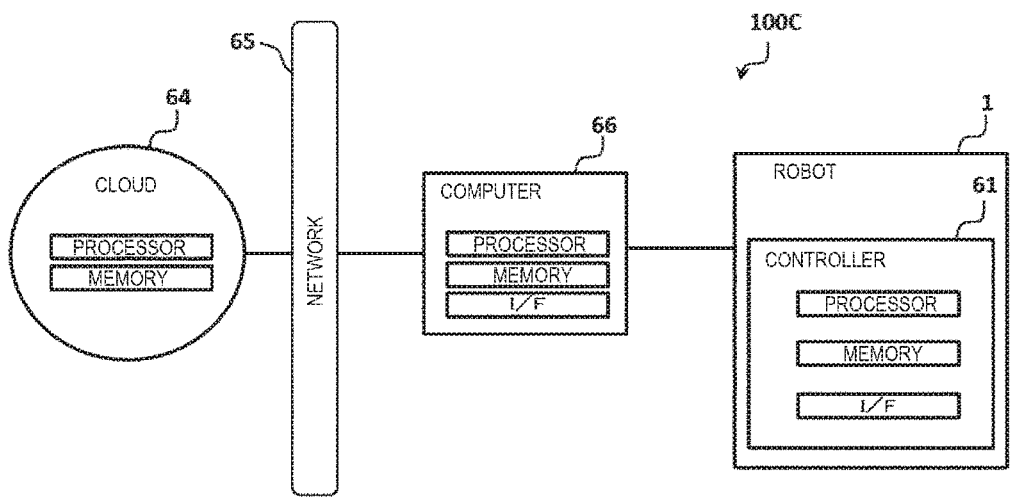
FIG. 36 is a block diagram showing modified example 2 with a focus on hardware of the robot system.

FIG. 36 is a block diagram showing modified example 2 with a focus on hardware of a robot system.

FIG. 36 shows an overall configuration of a robot system 100C in which the robot 1 containing the controller 61 and a computer 66 are coupled and the computer 66 is coupled to a cloud 64 via a network 65 such as a LAN. The control of the robot 1 may be executed by reading commands in a memory using a processor in the computer 66 or executed via the computer 66 by reading commands in a memory using a processor on the cloud 64.

Therefore, one, two, or three of the controller 61, the computer 66, and the cloud 64 may be regarded as "control apparatus 200".

As above, the robot system and coupling method according to the present disclosure are explained with respect to the illustrated embodiments, however, the present disclosure is not limited to those. The respective parts forming the robot system may be replaced by arbitrary configurations that may fulfill the same functions. Further, an arbitrary configuration may be added thereto.

What is claimed is:

1. A robot system that performs work of coupling a flexible cable to a connector provided on a board, comprising:
    a robot in which a gripping unit that grips the cable and a force detection unit that detects a force acting on the gripping unit are provided;
    a control unit that controls the robot to perform a conveyance action to grip the cable using the gripping unit and convey the cable onto the board, and an insertion action to insert the cable into the connector by force control based on a detection result in the force detection unit;
    an insertion speed entry part in which an insertion speed of the cable into the connector at the insertion action is entered;
    a memory unit that stores a calibration curve showing a relationship between the insertion speed and force control information necessary for the force control in the insertion action; and
    a determination unit that determines the force control information according to the insertion speed based on the calibration curve.

2. The robot system according to claim 1, wherein the force control information is a virtual coefficient of inertia, a virtual coefficient of viscosity, or a virtual modulus of elasticity.

3. The robot system according to claim 1, further comprising an insertion direction entry part in which an insertion direction of the cable into the connector at the insertion action is entered.

4. The robot system according to claim 3, further comprising a display unit that displays the insertion speed entry part and the insertion direction entry part together.

5. The robot system according to claim 1, further comprising a cable position entry part in which a position of the cable on the board when the conveyance action ends is entered.

6. The robot system according to claim 1, wherein
    the control unit controls the robot to perform a correction action to correct a posture of the cable in the insertion action by pressing the cable against the connector between the conveyance action and the insertion action,
    the robot system further comprising a pressing speed entry part in which a pressing speed of the cable against the connector at the correction action is entered, and wherein
    the determination unit determines the force control information in the correction action according to the pressing speed.

7. The robot system according to claim 6, further comprising a pressing direction entry part in which a pressing direction of the cable against the connector at the correction action is entered.

8. The robot system according to claim 6, wherein
    the robot has an imaging unit that images the cable gripped by the gripping unit and the connector, and
    the control unit controls the robot to perform an alignment action to align the cable gripped by the gripping unit with the connector based on an imaging result in the imaging unit with the cable separated from the connector between the correction action and the insertion action,
    the robot system further comprising a separation speed entry part in which a separation speed when the cable is separated from the connector before the alignment action is entered.

9. The robot system according to claim 8, further comprising a separation position entry part in which a separation position of the cable from the connector is entered.

10. A coupling method of coupling a flexible cable to a connector provided on a board, comprising:
- a preparation step of preparing a robot in which a gripping unit that grips the cable and a force detection unit that detects a force acting on the gripping unit are provided;
- a conveyance step of performing a conveyance action to grip the cable using the gripping unit and convey the cable onto the board;
- an insertion step of performing an insertion action to insert the cable into the connector using the gripping unit by force control based on a detection result in the force detection unit;
- an insertion speed entry step of entering an insertion speed of the cable into the connector at the insertion action in an insertion speed entry part; and
- a force control information at insertion action determination step of determining force control information by a determination unit according to the insertion speed based on a calibration curve showing a relationship between the insertion speed and the force control information necessary for the force control in the insertion action and stored in a memory unit.

11. The coupling method according to claim 10, further comprising:
- a correction step of performing a correction action to correct a posture of the cable by pressing the cable against the connector using the gripping unit between the conveyance step and the insertion step;
- a pressing speed entry step of entering a pressing speed of the cable against the connector at the correction action in a pressing speed entry part; and
- a force control information at correction action determination step of determining the force control information at the correction action by the determination unit according to the pressing speed.

12. The coupling method according to claim 11, further comprising a pressing direction entry step of entering a pressing direction of the cable against the connector at the correction action in a pressing direction entry part.

13. The coupling method according to claim 11, wherein the robot has an imaging unit that images the cable gripped by the gripping unit and the connector,
the coupling method further comprising:
- an alignment step of performing an alignment action to align the cable gripped by the gripping unit with the connector based on an imaging result in the imaging unit with the cable separated from the connector between the correction step and the insertion step; and
- a separation speed entry part of entering a separation speed of the cable when the cable is separated from the connector before the alignment action in a separation speed entry part.

* * * * *